United States Patent
Kurokawa

(10) Patent No.: US 12,517,334 B2
(45) Date of Patent: Jan. 6, 2026

(54) ZOOM LENS AND IMAGE PICKUP APPARATUS

(71) Applicant: CANON KABUSHIKI KAISHA, Tokyo (JP)

(72) Inventor: Shuichi Kurokawa, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 294 days.

(21) Appl. No.: 18/449,731

(22) Filed: Aug. 15, 2023

(65) Prior Publication Data

US 2024/0077708 A1   Mar. 7, 2024

(30) Foreign Application Priority Data

Aug. 30, 2022 (JP) .................... 2022-136475

(51) Int. Cl.
| | |
|---|---|
| *G02B 15/14* | (2006.01) |
| *G02B 13/02* | (2006.01) |
| *H04N 23/69* | (2023.01) |
| *G02B 13/00* | (2006.01) |

(52) U.S. Cl.
CPC ..... *G02B 15/143503* (2019.08); *G02B 13/02* (2013.01); *H04N 23/69* (2023.01); *G02B 13/009* (2013.01)

(58) Field of Classification Search
CPC .............................. G02B 15/145523
See application file for complete search history.

(56) References Cited

U.S. PATENT DOCUMENTS

| | | | | |
|---|---|---|---|---|
| 7,233,447 | B2 * | 6/2007 | Baba ................ | G02B 15/1465 359/676 |
| 2006/0139766 | A1 * | 6/2006 | Sawamoto ..... | G02B 15/145523 359/680 |
| 2009/0195884 | A1 * | 8/2009 | Inoko ................. | G02B 13/22 359/682 |
| 2011/0279908 | A1 | 11/2011 | Kon | |
| 2012/0050602 | A1 * | 3/2012 | Imaoka ............... | G02B 27/644 359/683 |
| 2018/0196241 | A1 * | 7/2018 | Shibayama ......... | G02B 9/60 |

(Continued)

FOREIGN PATENT DOCUMENTS

| | | |
|---|---|---|
| JP | 2001-350094 A | 12/2001 |
| JP | 2004-133338 A | 4/2004 |

(Continued)

OTHER PUBLICATIONS

Combined Search and Examination Report issued by the Intellectual Property Office on Feb. 1, 2024 in corresponding GB Patent Application No. GB2312760.8.

(Continued)

*Primary Examiner* — Robert E. Tallman
(74) *Attorney, Agent, or Firm* — Carter, DeLuca & Farrell LLP

(57) ABSTRACT

A zoom lens includes, in order from an object side to an image side, a first lens unit having negative refractive power, a second lens unit having positive refractive power, and a rear group including one or more lens units. The first lens unit does not move during zooming, and distances between adjacent lens units change during zooming. The first lens unit includes two or more negative lenses. A predetermined condition is satisfied.

16 Claims, 17 Drawing Sheets

(56) References Cited

U.S. PATENT DOCUMENTS

| | | | |
|---|---|---|---|
| 2021/0033831 A1* | 2/2021 | Kurokawa | ..... G02B 15/143105 |
| 2021/0356721 A1 | 11/2021 | Komiyama | |
| 2023/0266572 A1 | 8/2023 | Kurokawa | |

FOREIGN PATENT DOCUMENTS

| | | | |
|---|---|---|---|
| JP | 2006-091480 | A | 4/2006 |
| JP | 2009-020283 | A | 1/2009 |
| JP | 2010-266577 | A | 11/2010 |
| JP | 2011-013469 | A | 1/2011 |
| JP | 2011-053663 | A | 3/2011 |
| JP | 2012-047813 | A | 3/2012 |
| JP | 2014-109761 | A | 6/2014 |

OTHER PUBLICATIONS

Search Report issued by the Intellectual Property Office on Jan. 25, 2024 in corresponding GB Patent Application No. GB2312760.8.
Notice of Reasons for Refusal issued by the Japanese Patent Office on Apr. 23, 2023 in corresponding JP Patent Application No. 2022-136475, with English translation.

* cited by examiner

ZOOM LENS AND IMAGE PICKUP APPARATUS

BACKGROUND

Technical Field

One of the aspects of the embodiments relates to a zoom lens and an image pickup apparatus.

Description of Related Art

Zoom lenses for surveillance cameras, digital still cameras, video cameras, broadcasting cameras, etc. are demanded to have a wide angle of view. The zoom lenses are also demanded to have a small size for easy handling and installation of the camera.

Japanese Patent Applications Laid-Open Nos. 2012-047813 and 2014-109761 disclose negative lead type zoom lenses having a wide angle of view and small size.

Along with the high resolution of the image sensor installed in the camera, zoom lenses are demanded not only to have a wider angle and smaller size, but also to have high optical performance, including resolving power corresponding to the high resolution of the video standard 8K.

SUMMARY

A zoom lens according to one aspect of the embodiment includes, in order from an object side to an image side, a first lens unit having negative refractive power, a second lens unit having positive refractive power, and a rear group including one or more lens units. The first lens unit does not move during zooming, and distances between adjacent lens units change during zooming. The first lens unit includes two or more negative lenses. The following inequalities are satisfied:

$$1.9 \leq ft/fw \leq 4.0$$

$$-0.85 \leq f1/f2 \leq -0.55$$

$$62 \leq vd1n\_ave \leq 95$$

where $vd1n\_ave$ is an average Abbe number of all negative lenses included in the first lens unit, $f1$ is a focal length of the first lens unit, $f2$ is a focal length of the second lens unit, $fw$ is a focal length at a wide-angle end of the zoom lens, and $ft$ is a focal length at a telephoto end of the zoom lens. An image pickup apparatus and an imaging system each having the above zoom lens also constitute another aspect of the embodiment.

Further features of the disclosure will become apparent from the following description of embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

DESCRIPTION OF THE EMBODIMENTS

Figure 1:
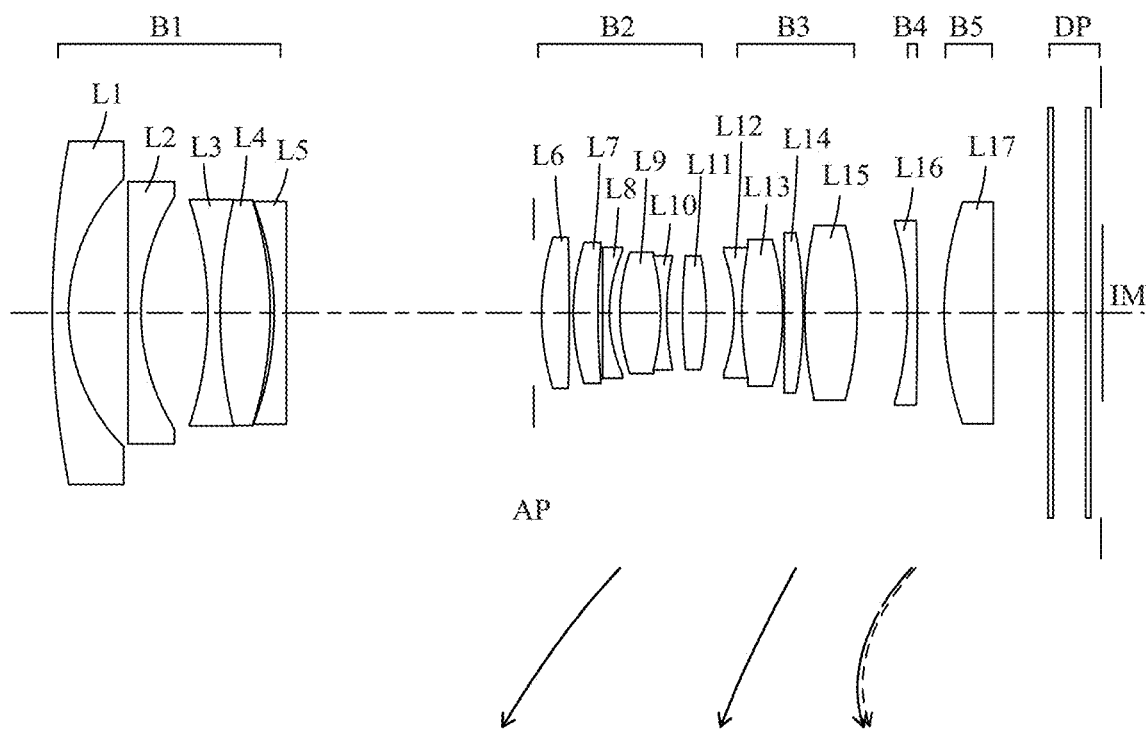
FIG. 1 is a sectional view of a zoom lens according to Example 1.
Figure 2A:
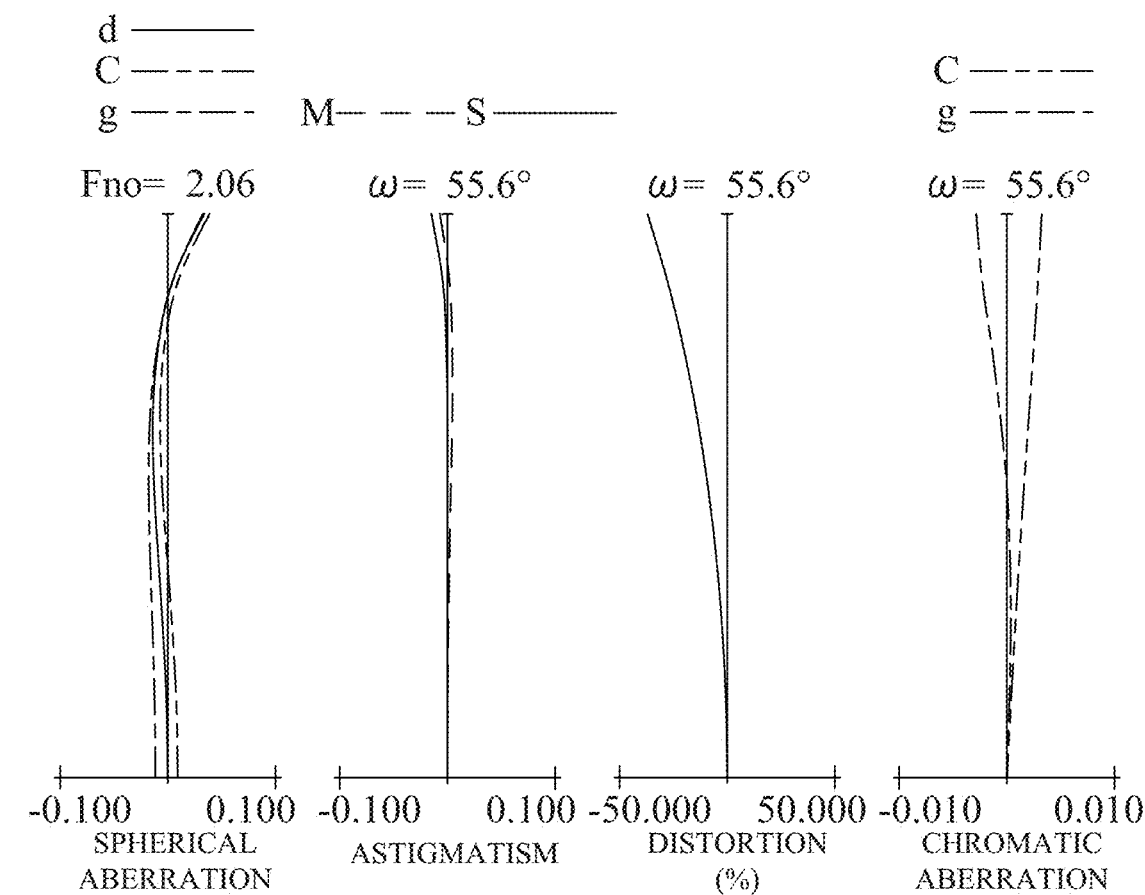
FIGS. 2A, 2B, and 2C are aberration diagrams of the zoom lens according to Example 1 at a wide-angle end, an intermediate focal length, and a telephoto end.
Figure 2B:
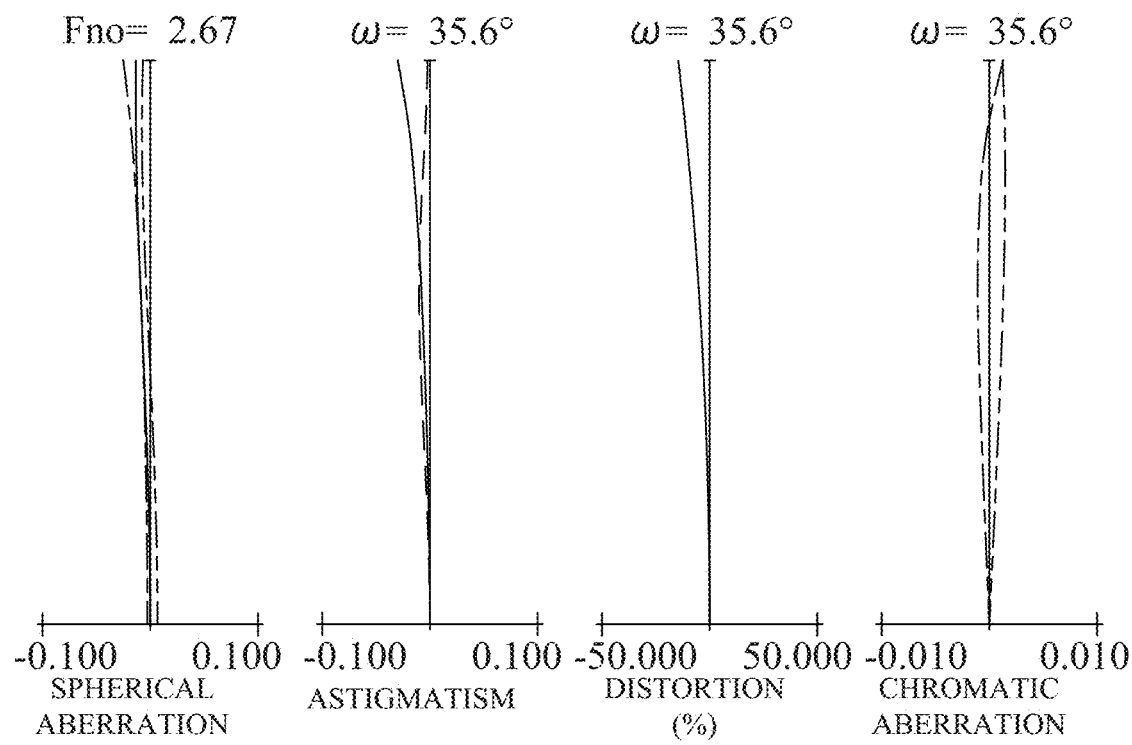
Figure 2C:
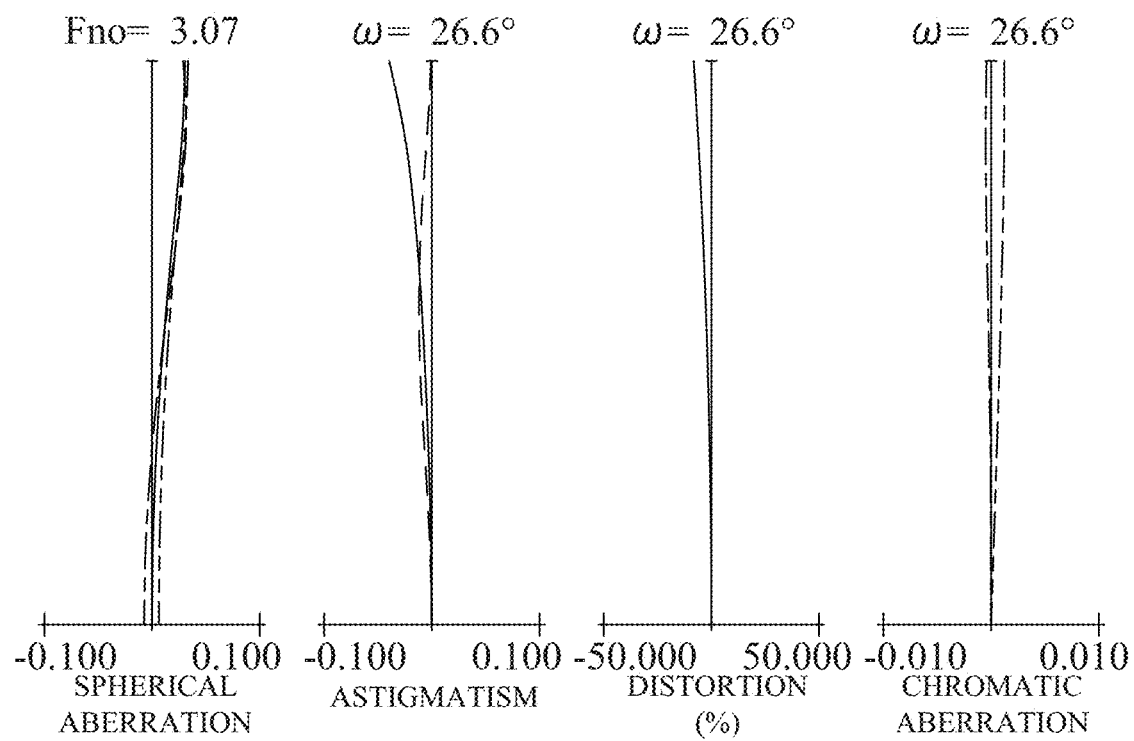
Figure 3:
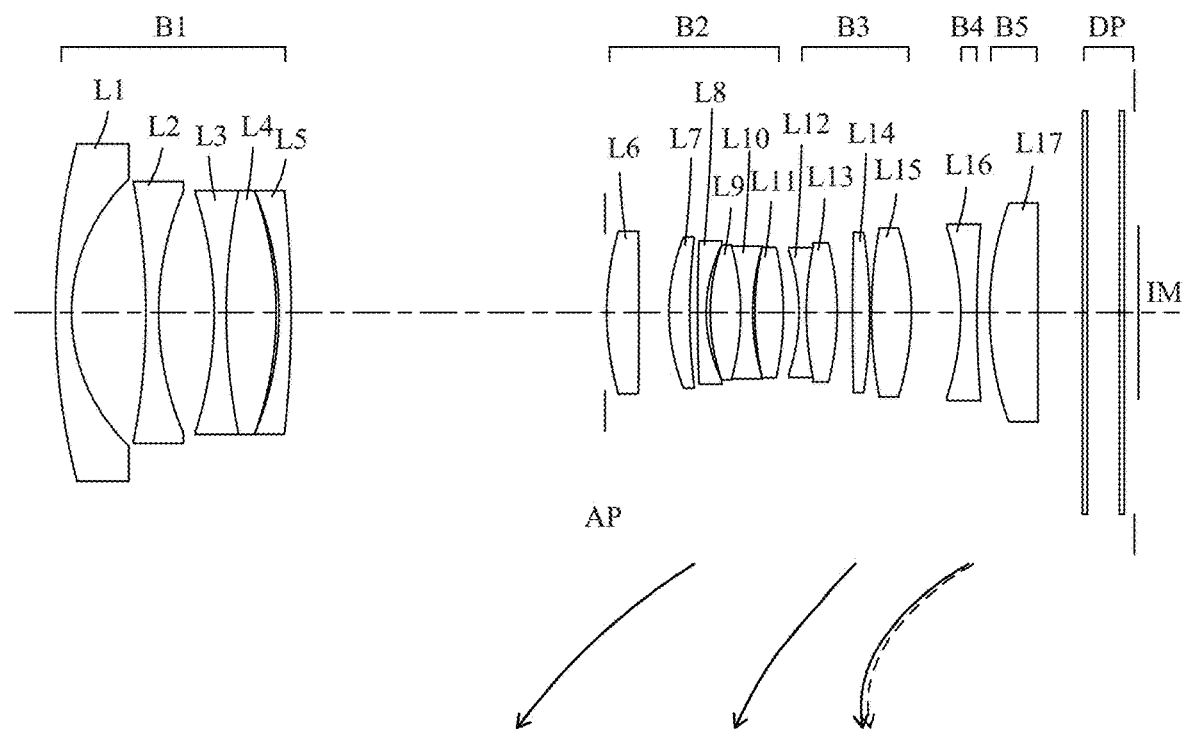
FIG. 3 is a sectional view of a zoom lens according to Example 2.
Figure 4A:
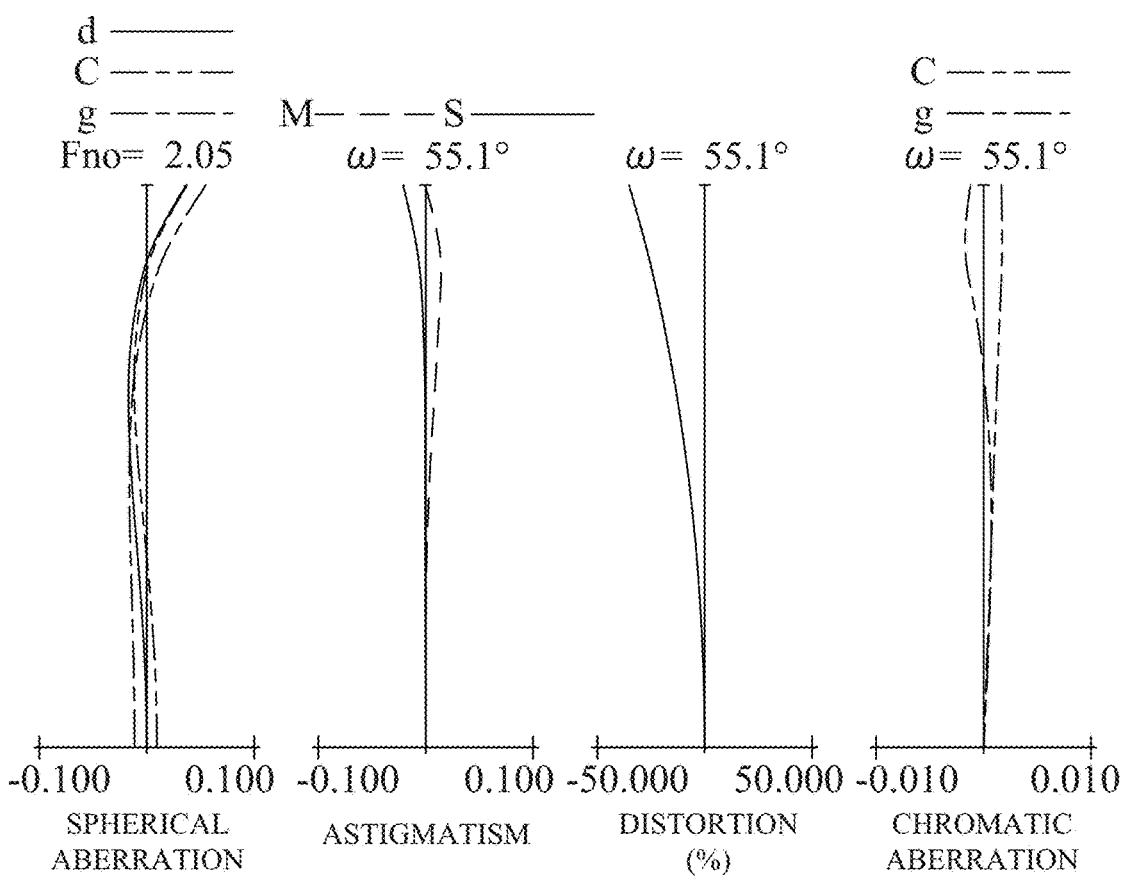
FIGS. 4A, 4B, and 4C are aberration diagrams of the zoom lens according to Example 2 at a wide-angle end, an intermediate focal length, and a telephoto end.
Figure 4B:
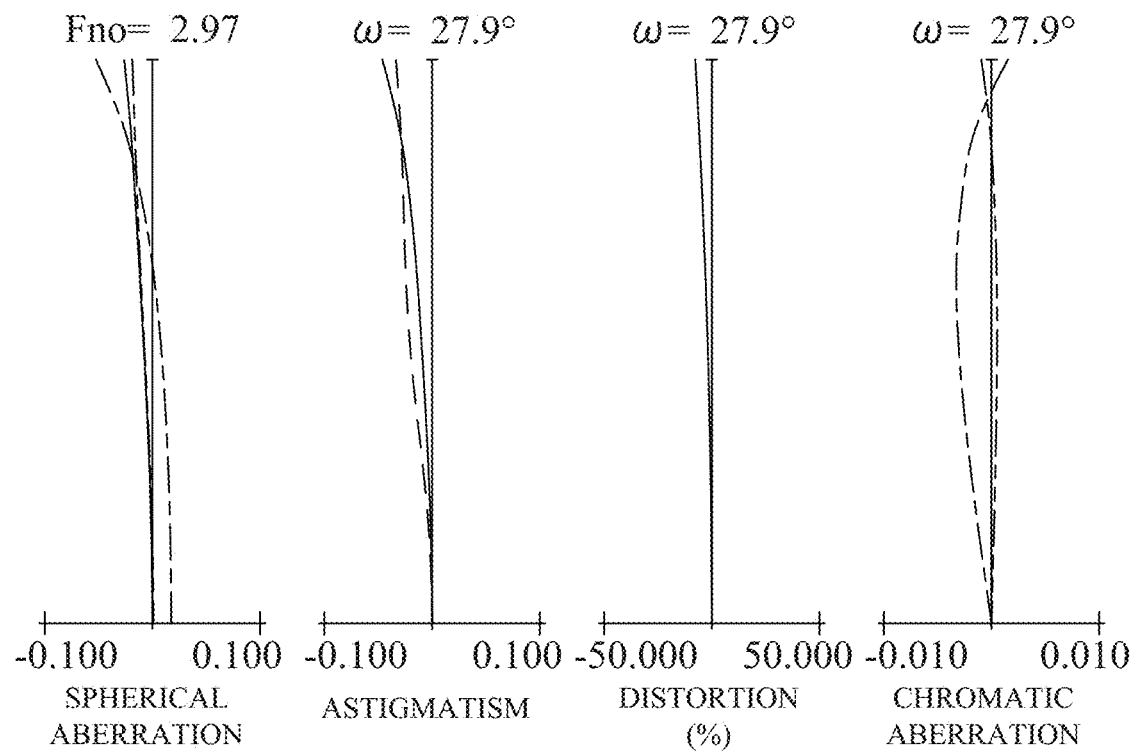
Figure 4C:
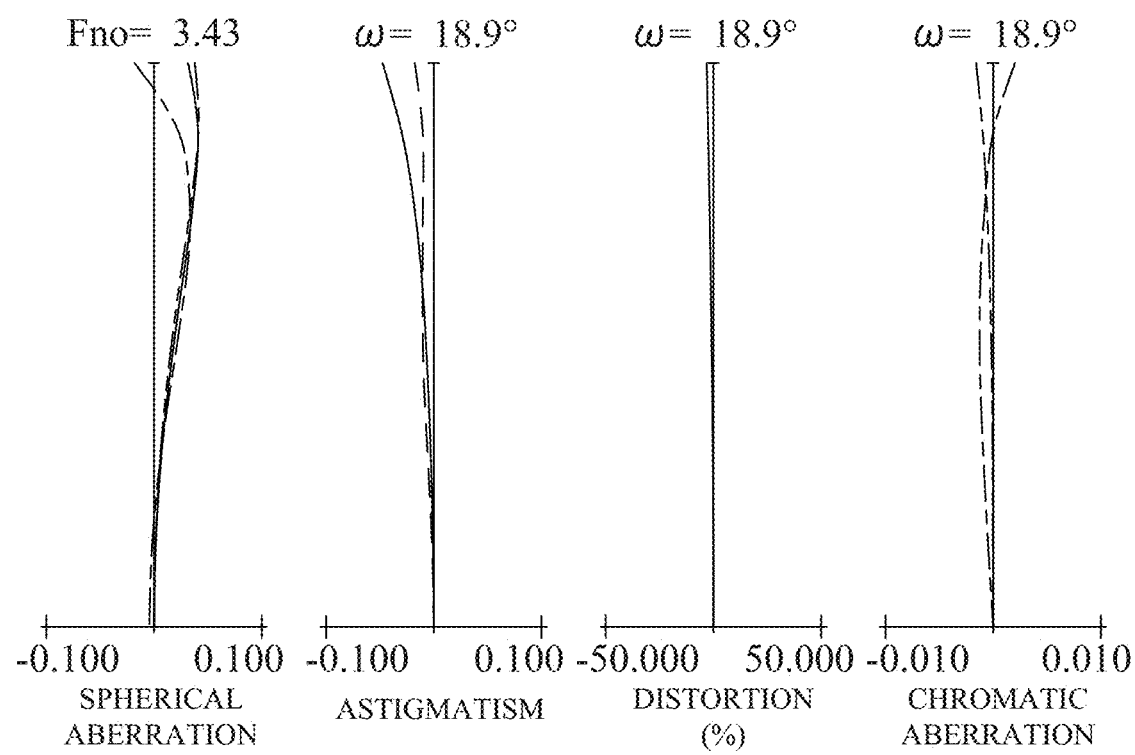
Figure 5:
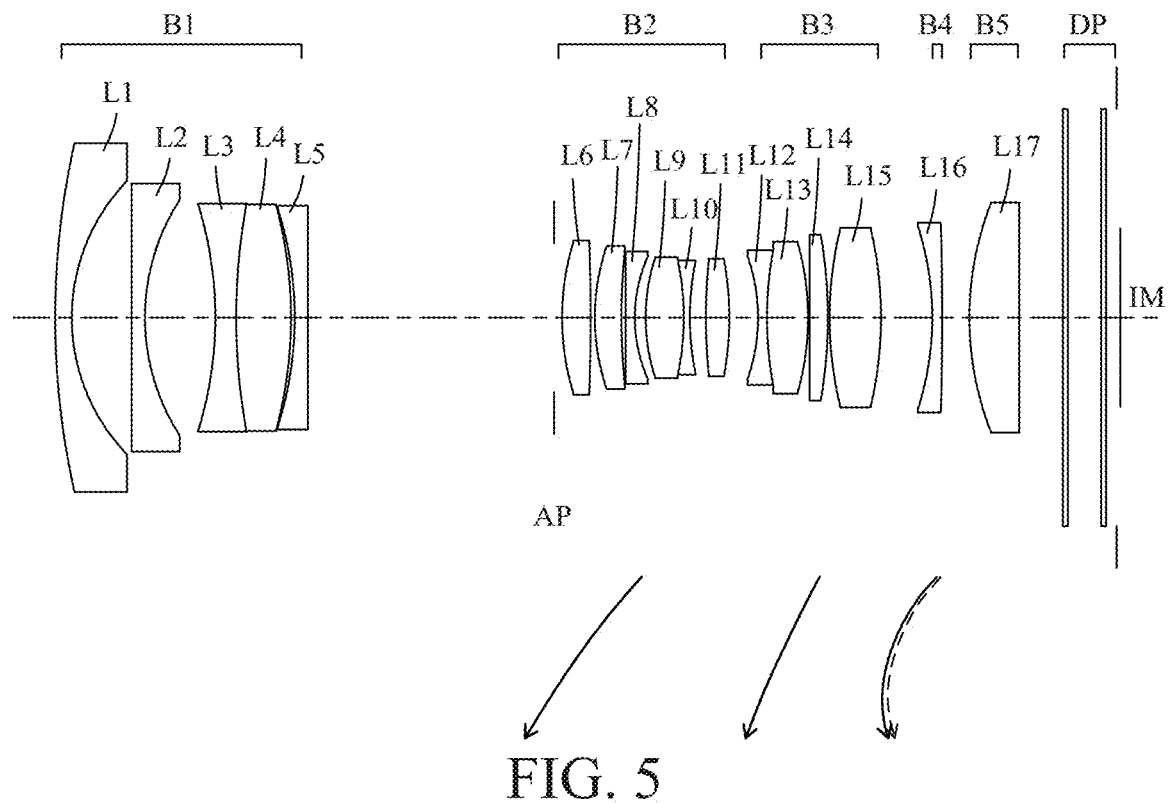
FIG. 5 is a sectional view of a zoom lens according to Example 3.
Figure 6A:
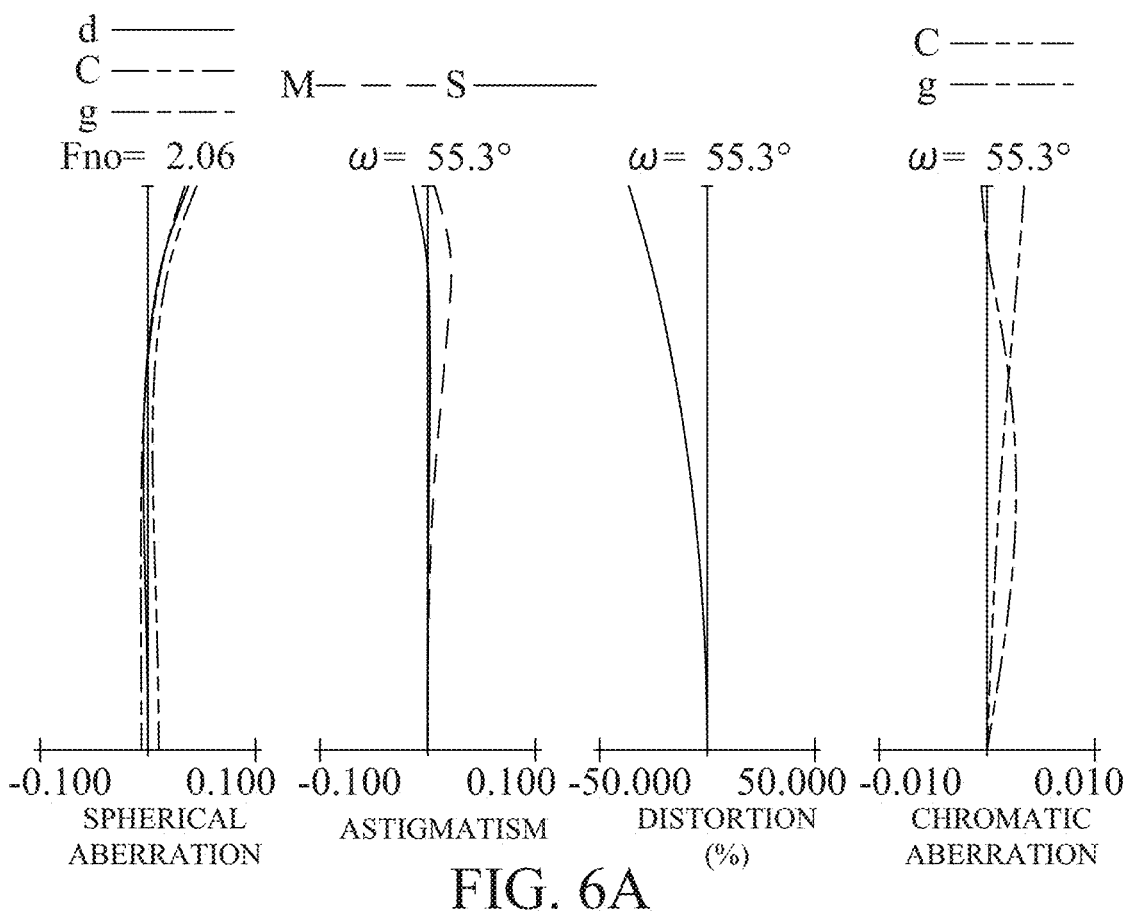
FIGS. 6A, 6B, and 6C are aberration diagrams of the zoom lens according to Example 3 at a wide-angle end, an intermediate focal length, and a telephoto end.
Figure 6B:
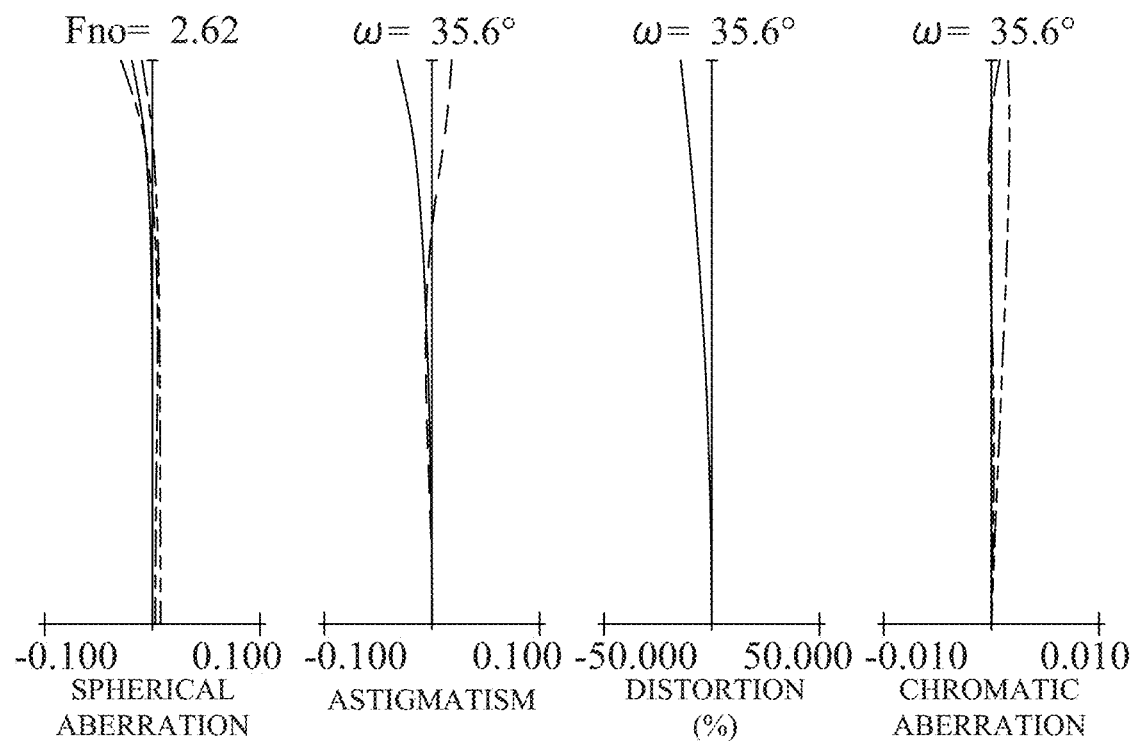
Figure 6C:
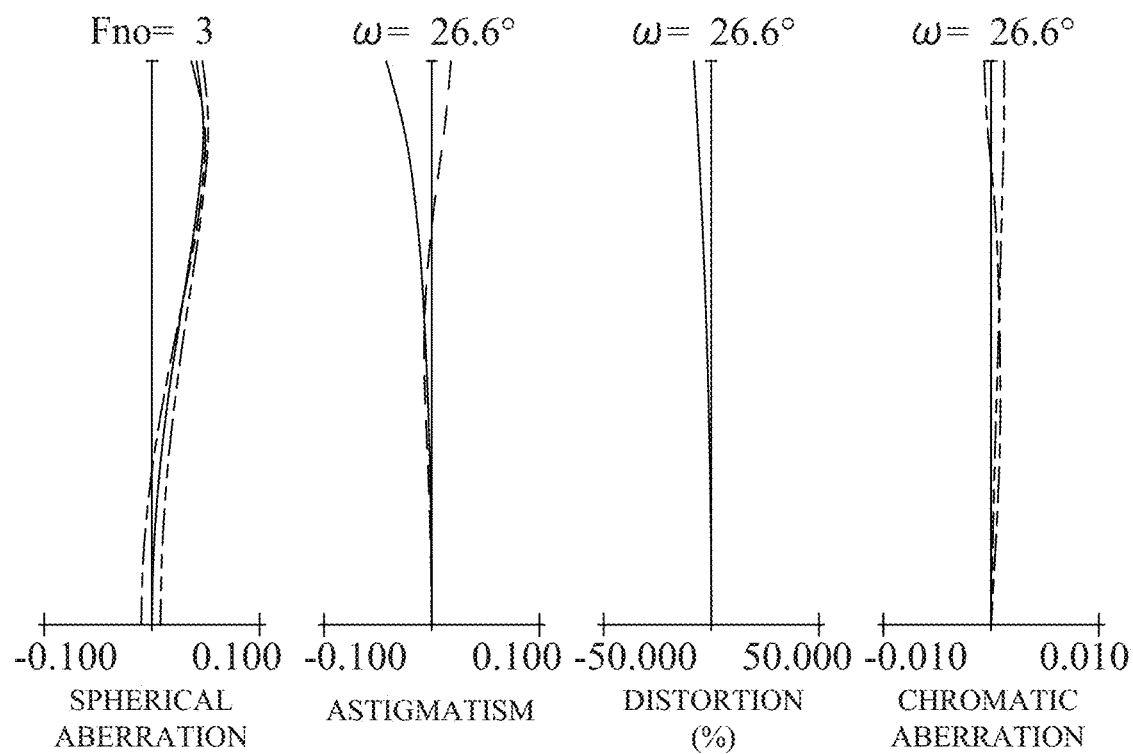
Figure 7:
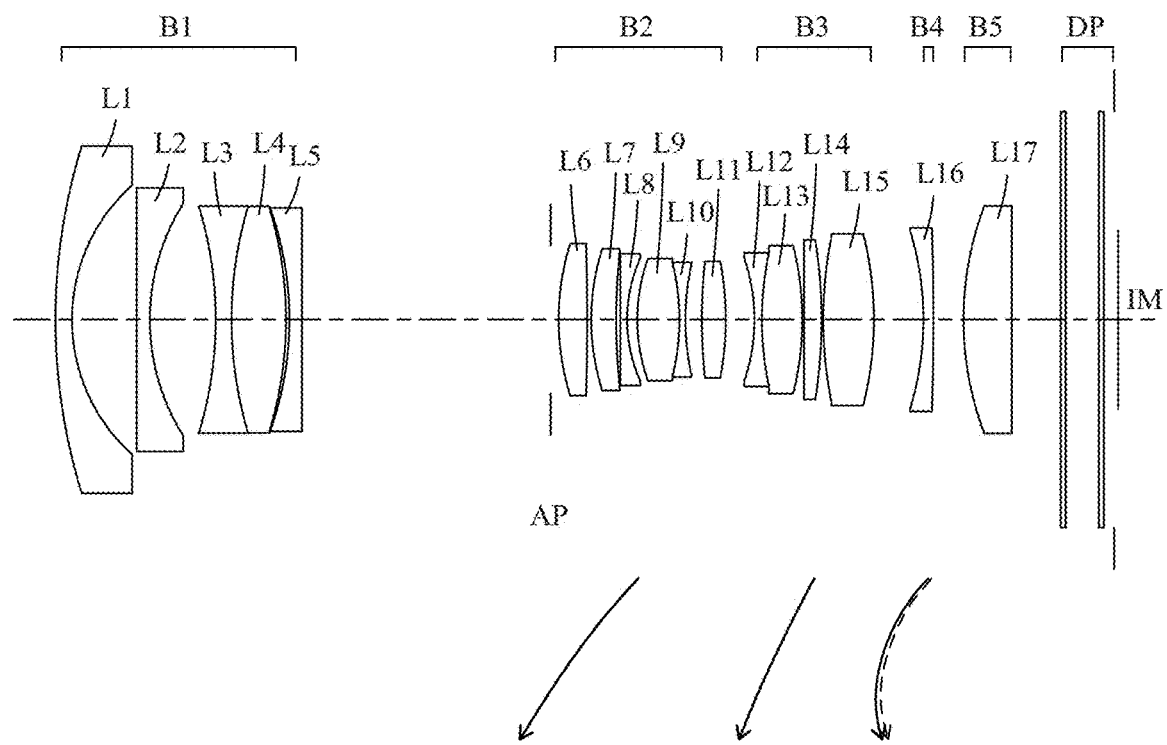
FIG. 7 is a sectional view of a zoom lens according to Example 4.
Figure 8A:
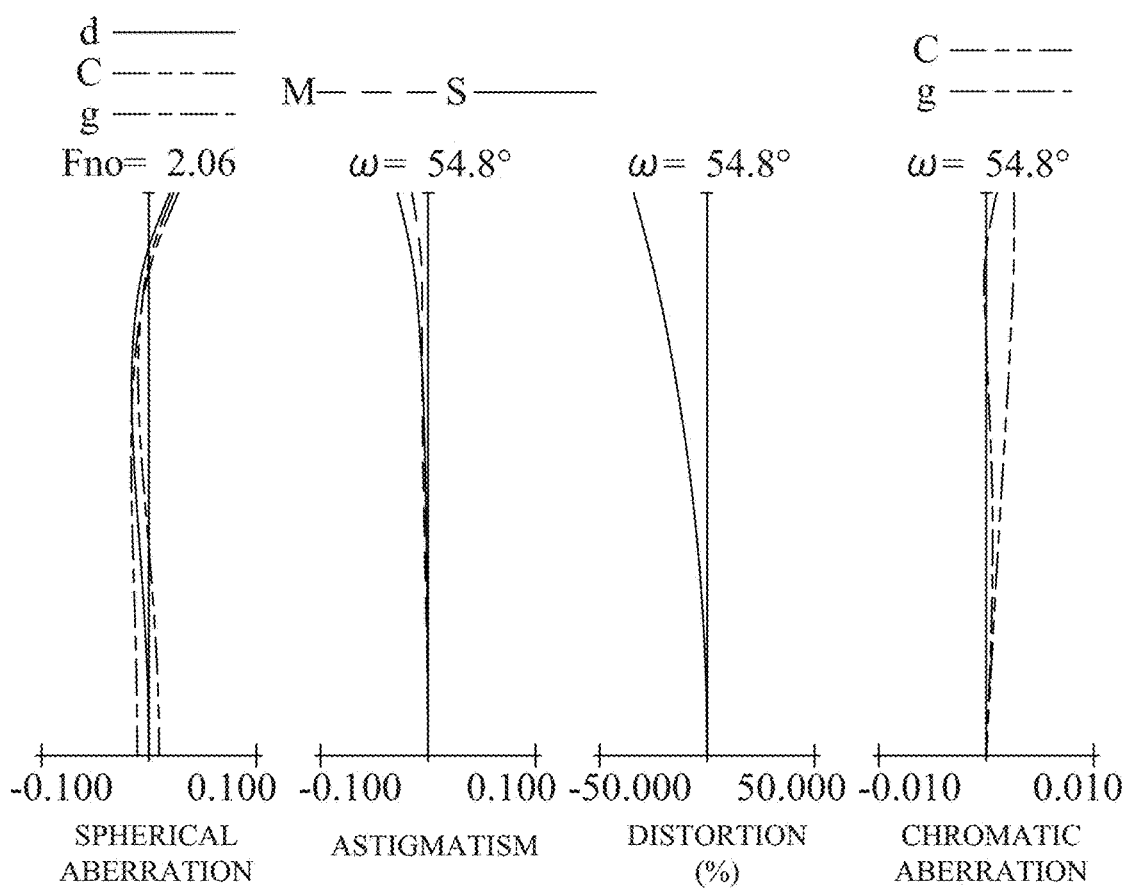
FIGS. 8A, 8B, and 8C are aberration diagrams of the zoom lens according to Example 4 at a wide-angle end, an intermediate focal length, and a telephoto end.
Figure 8B:
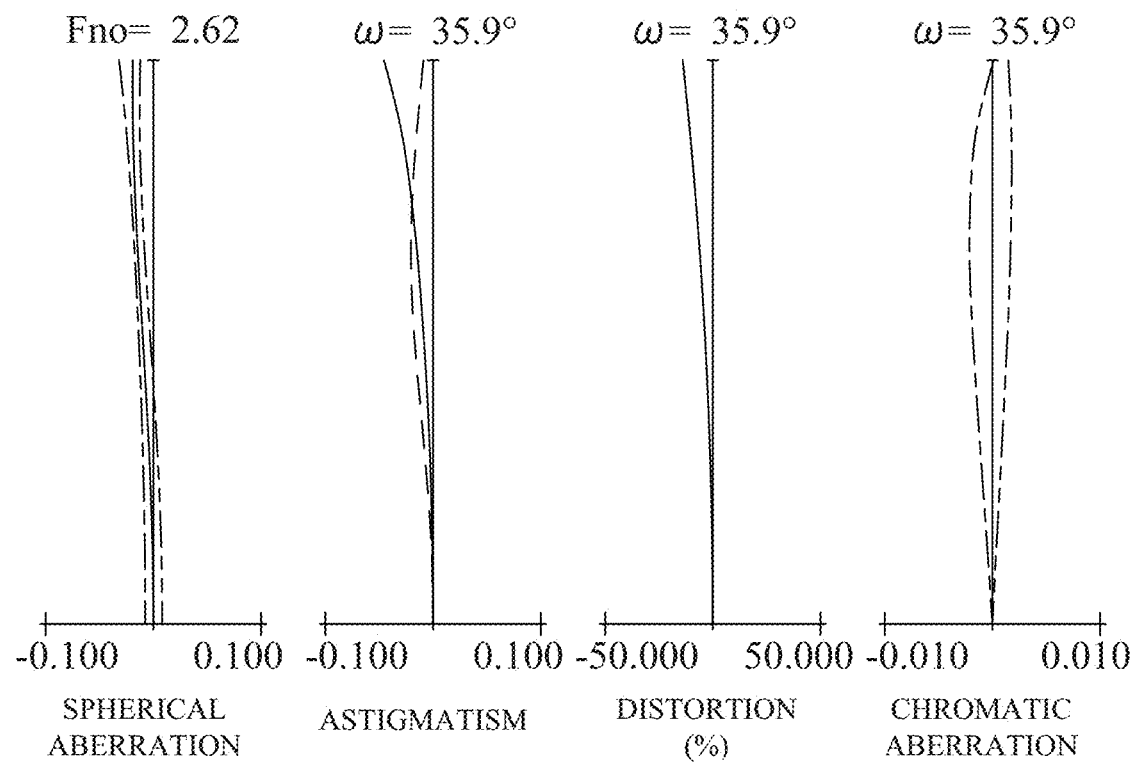
Figure 8C:
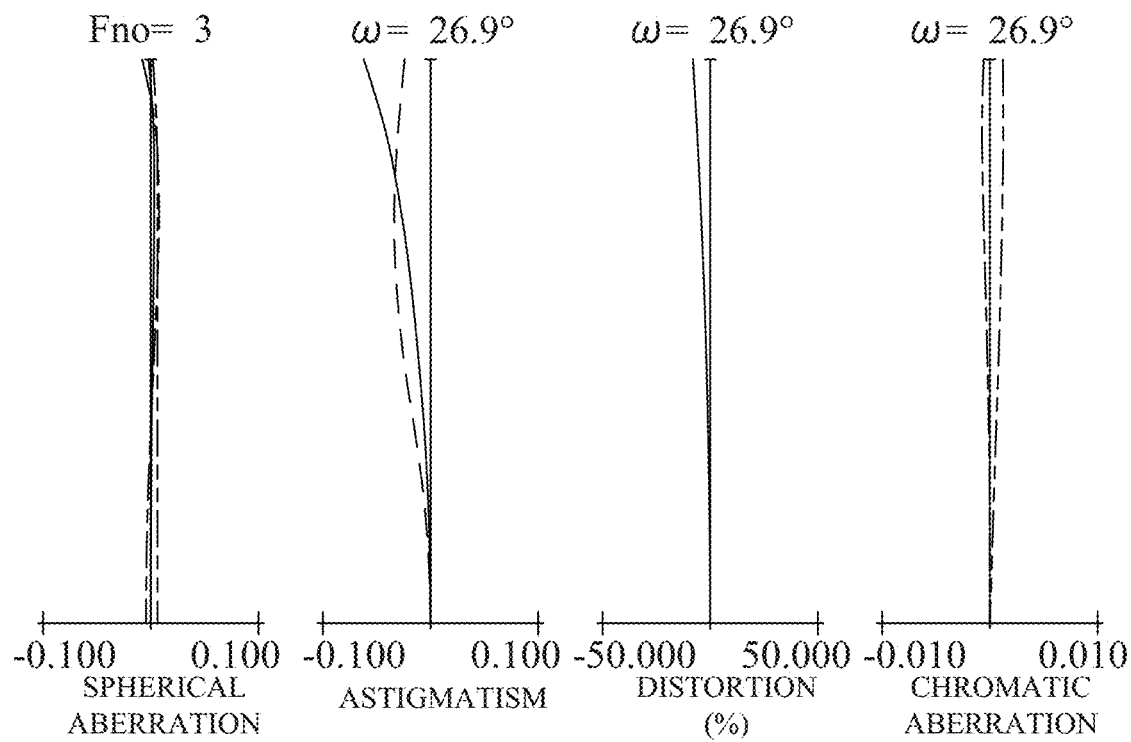
Figure 9:
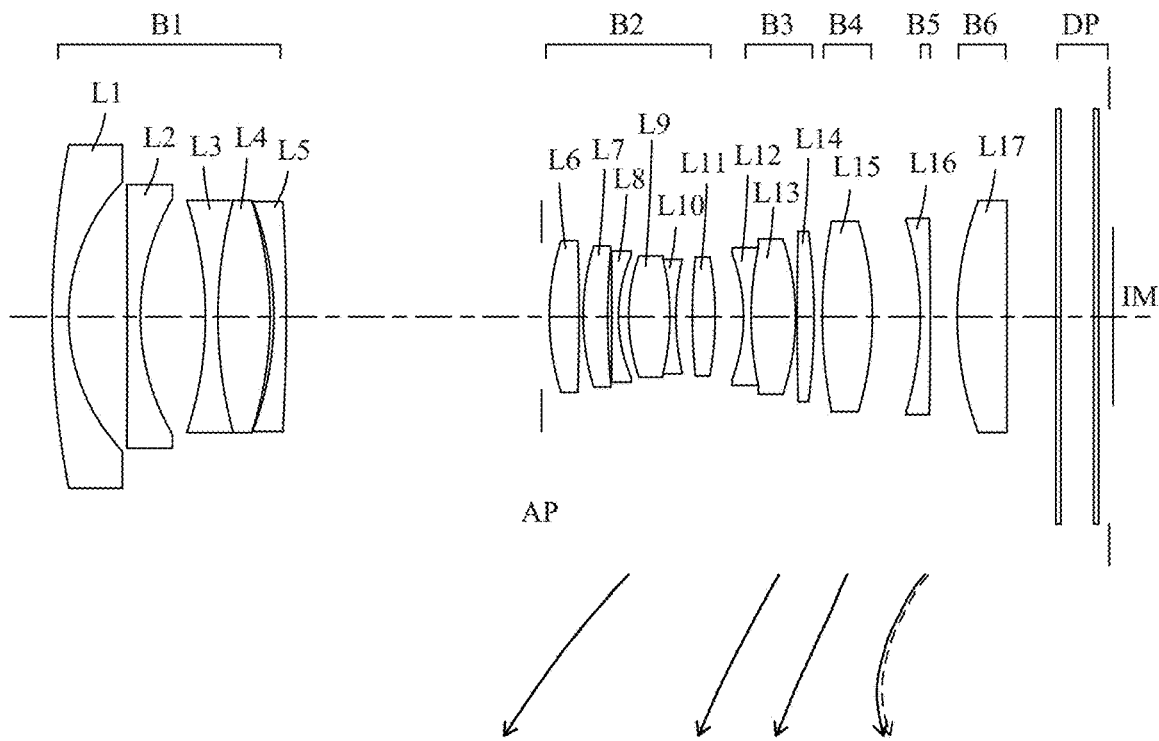
FIG. 9 is a sectional view of a zoom lens according to Example 5.
Figure 10A:
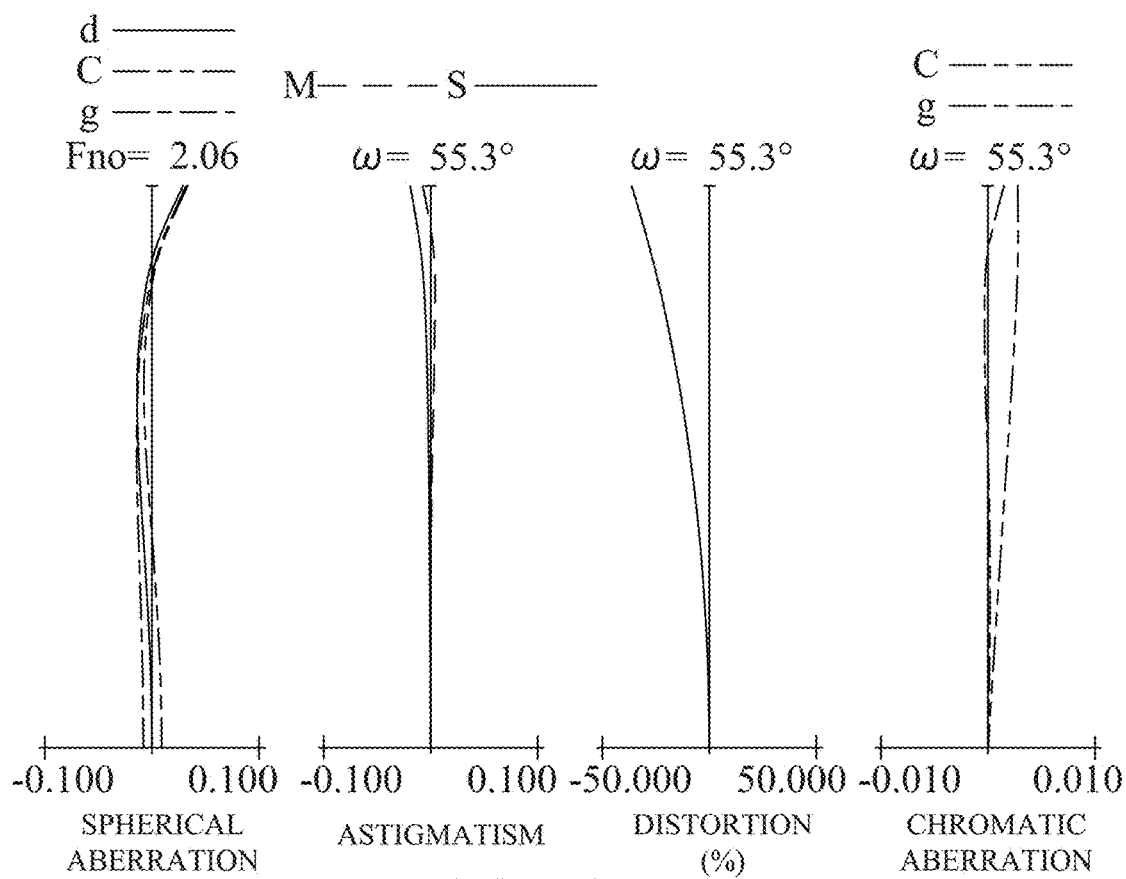
FIGS. 10A, 10B, and 10C are aberration diagrams of the zoom lens according to Example 5 at a wide-angle end, an intermediate focal length, and a telephoto end.
Figure 10B:
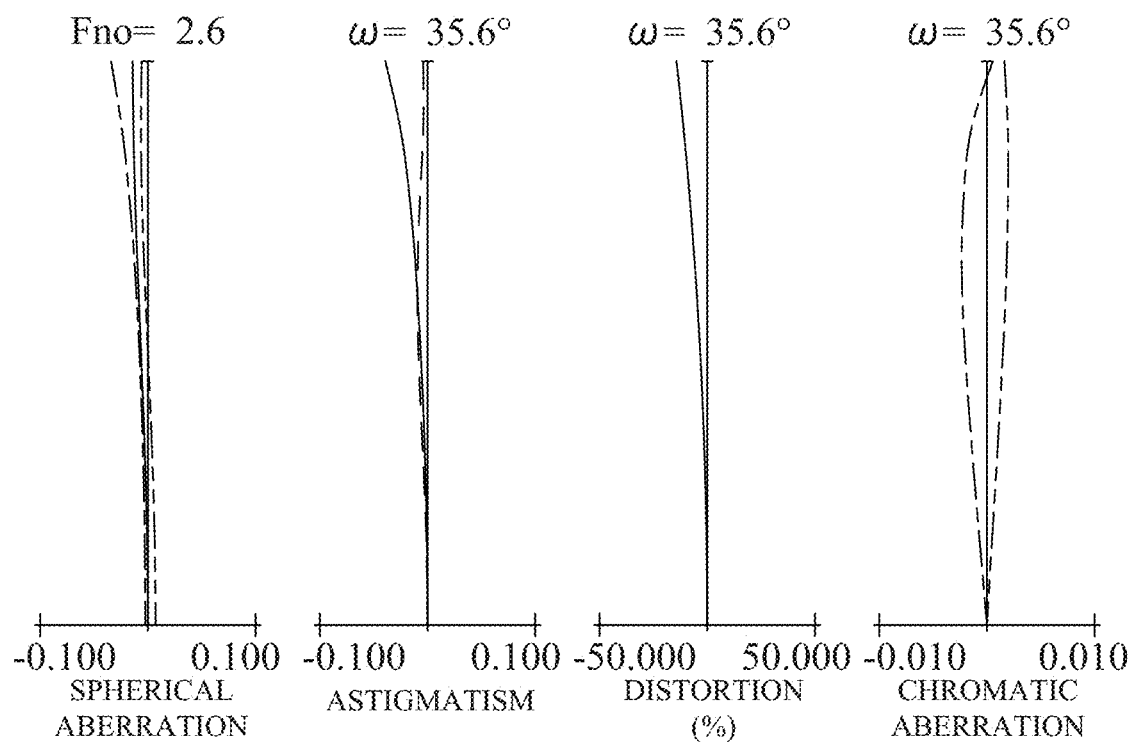
Figure 10C:
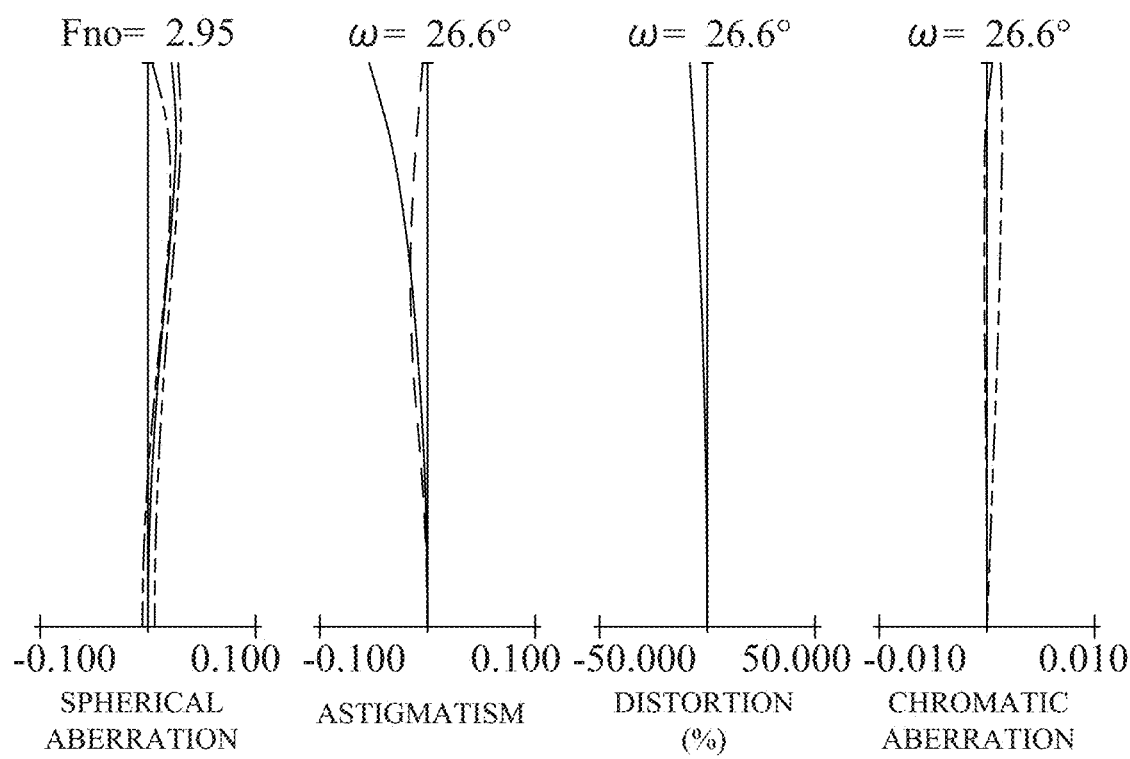
Figure 11:
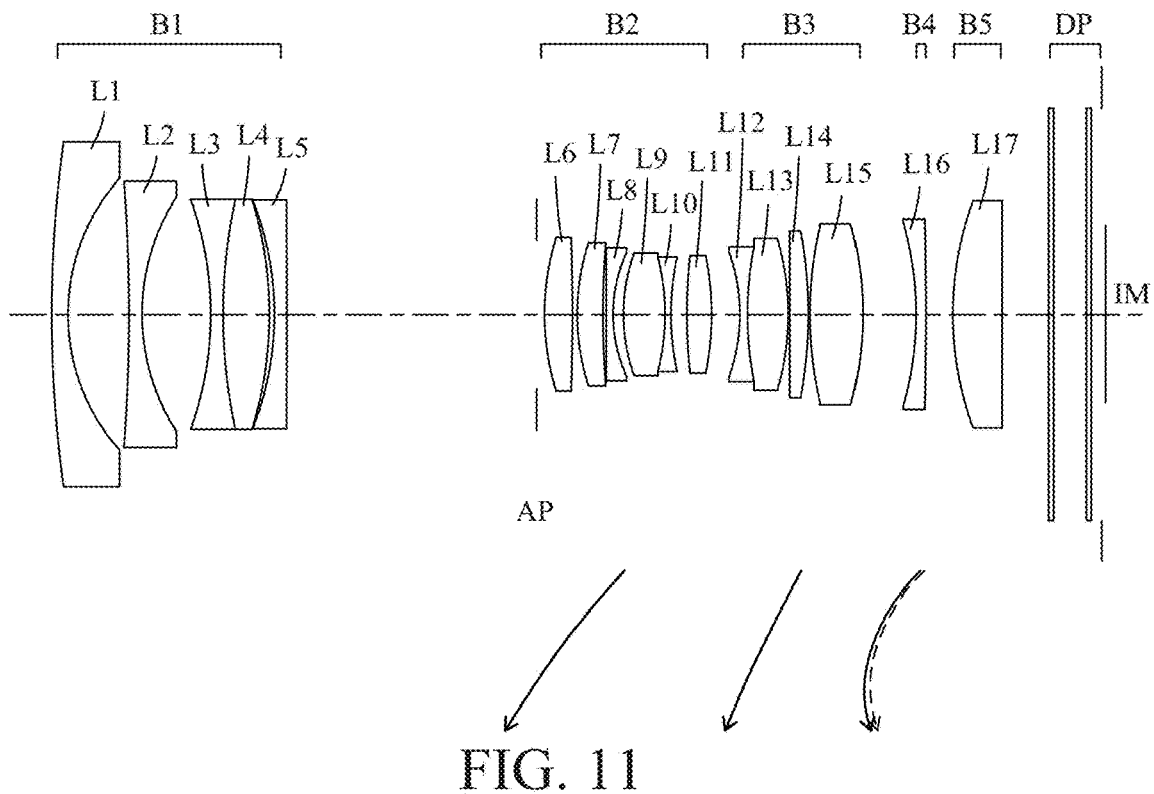
FIG. 11 is a sectional view of a zoom lens according to Example 6.
Figure 12A:
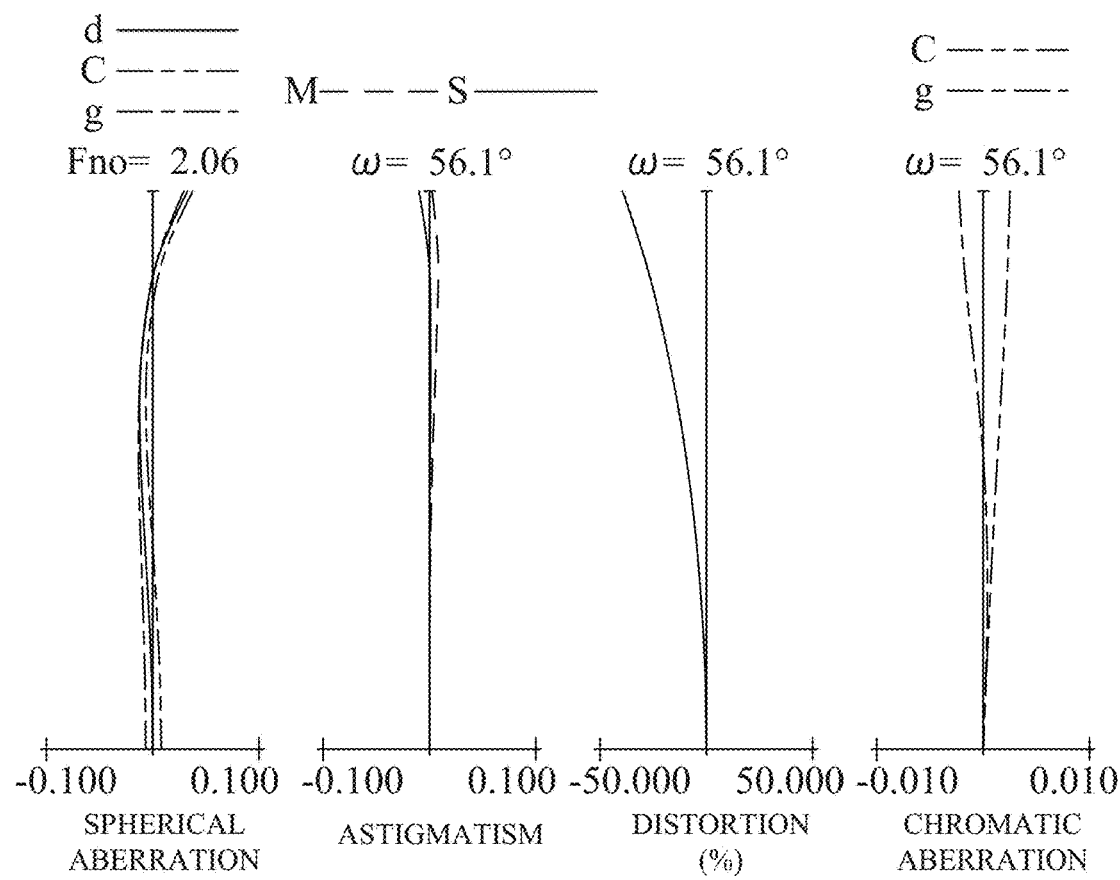
FIGS. 12A, 12B, and 12C are aberration diagrams of the zoom lens according to Example 6 at a wide-angle end, an intermediate focal length, and a telephoto end.
Figure 12B:
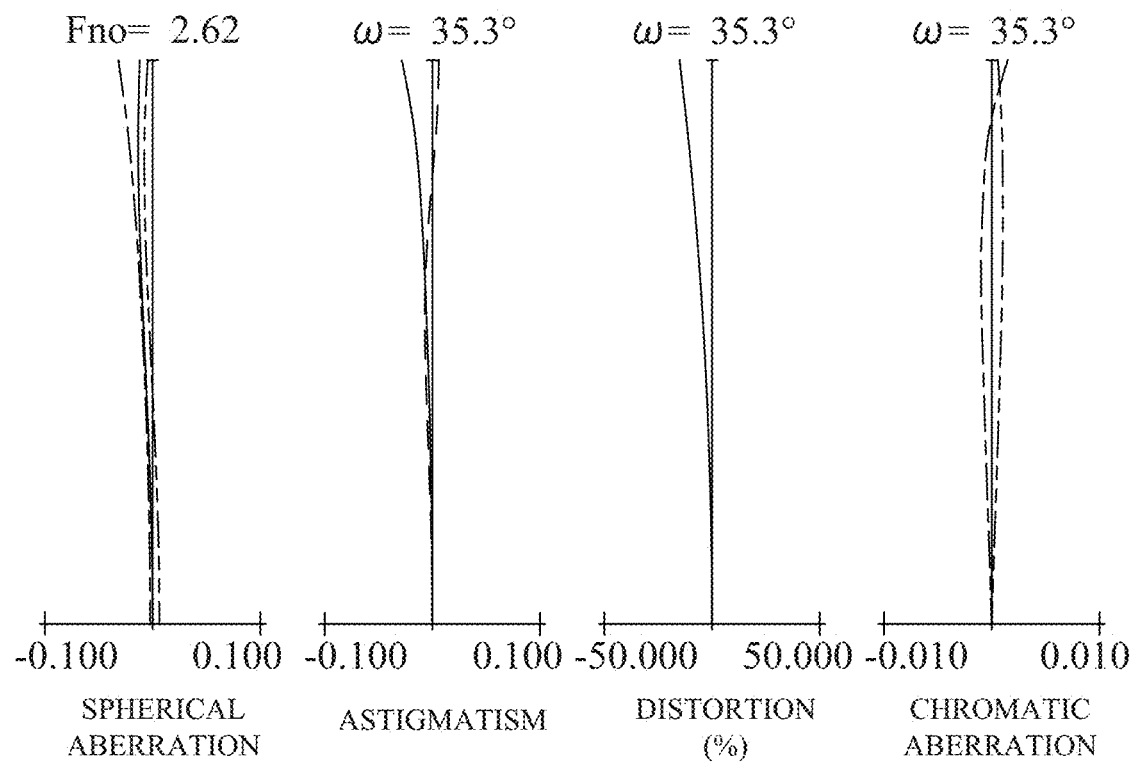
Figure 12C:
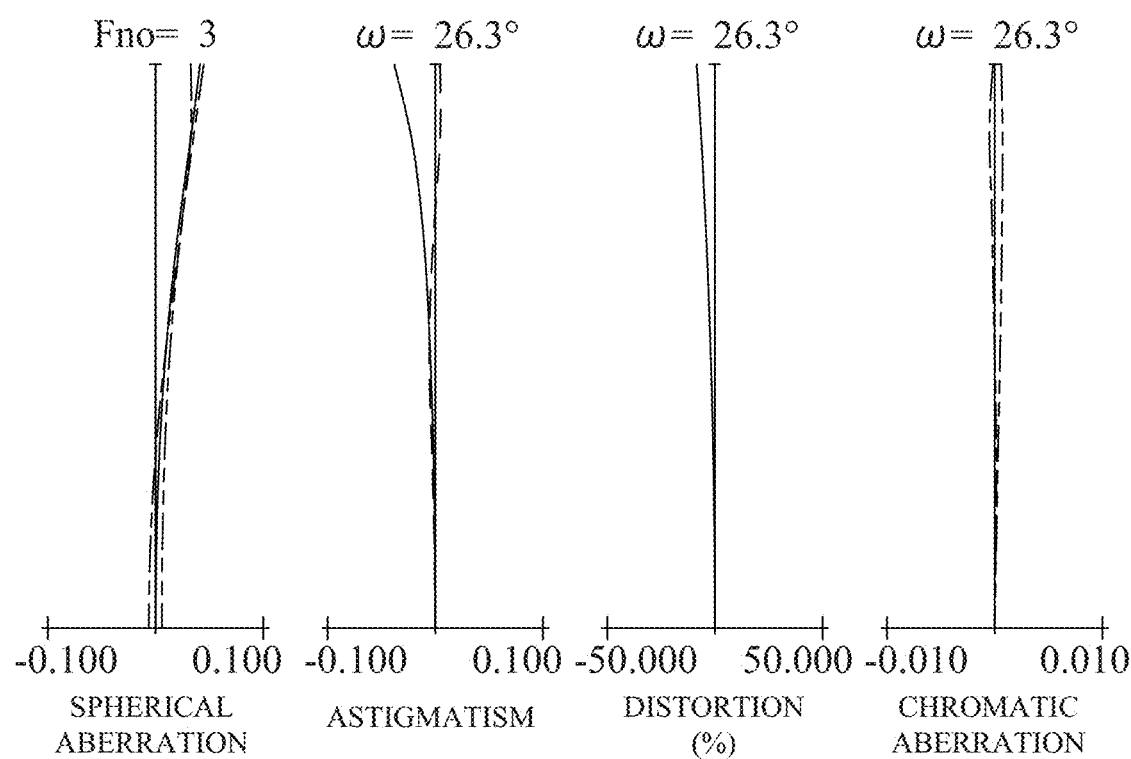
Figure 13:
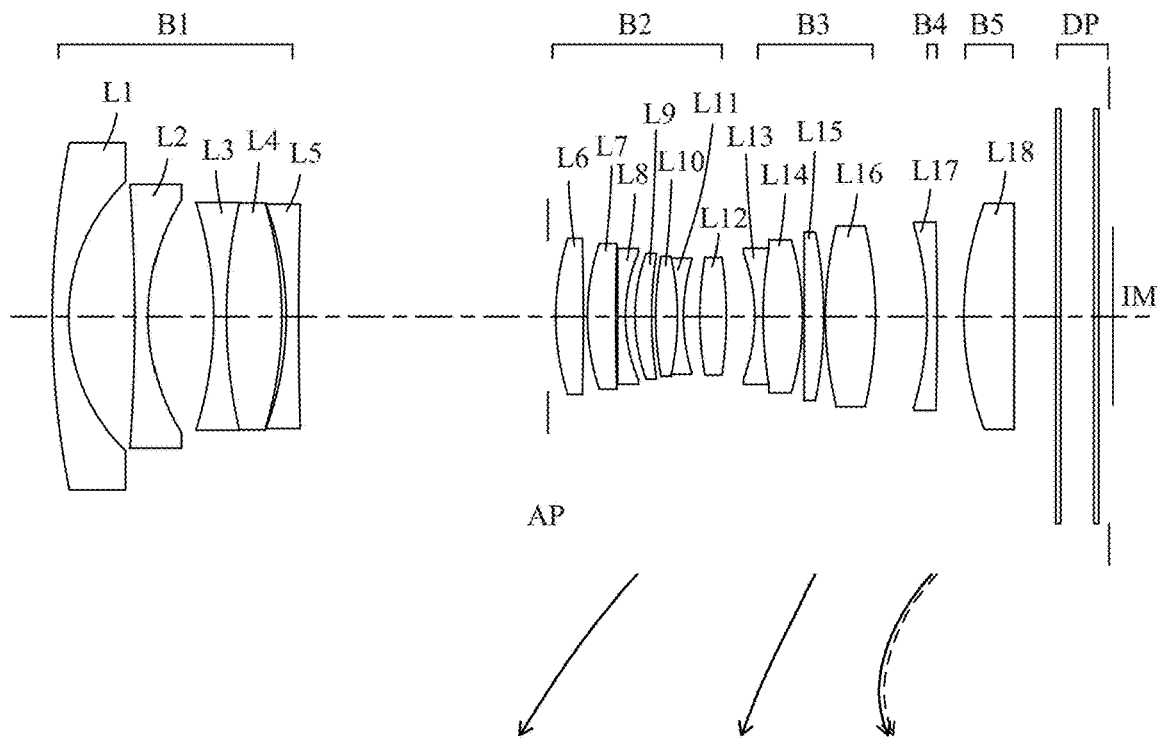
FIG. 13 is a sectional view of a zoom lens according to Example 7.
Figure 14A:
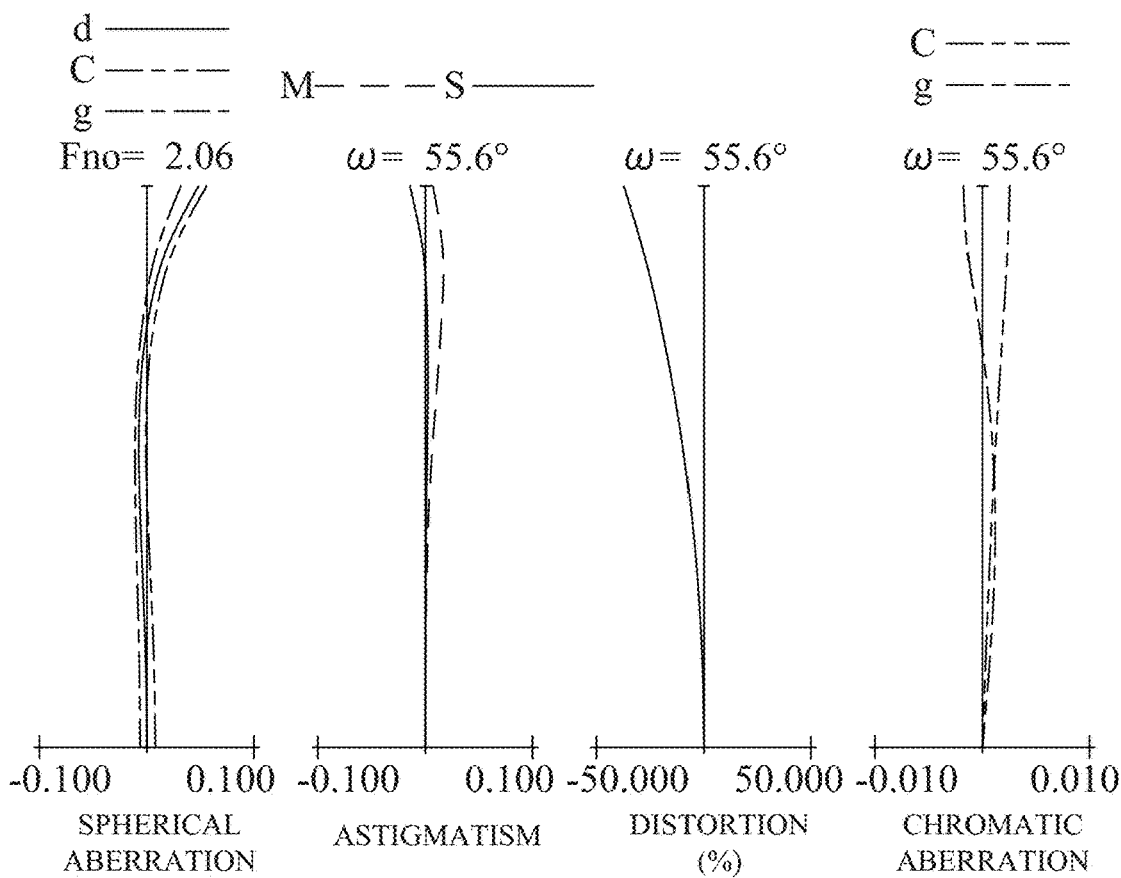
FIGS. 14A, 14B, and 14C are aberration diagrams of the zoom lens according to Example 7 at a wide-angle end, an intermediate focal length, and a telephoto end.
Figure 14B:
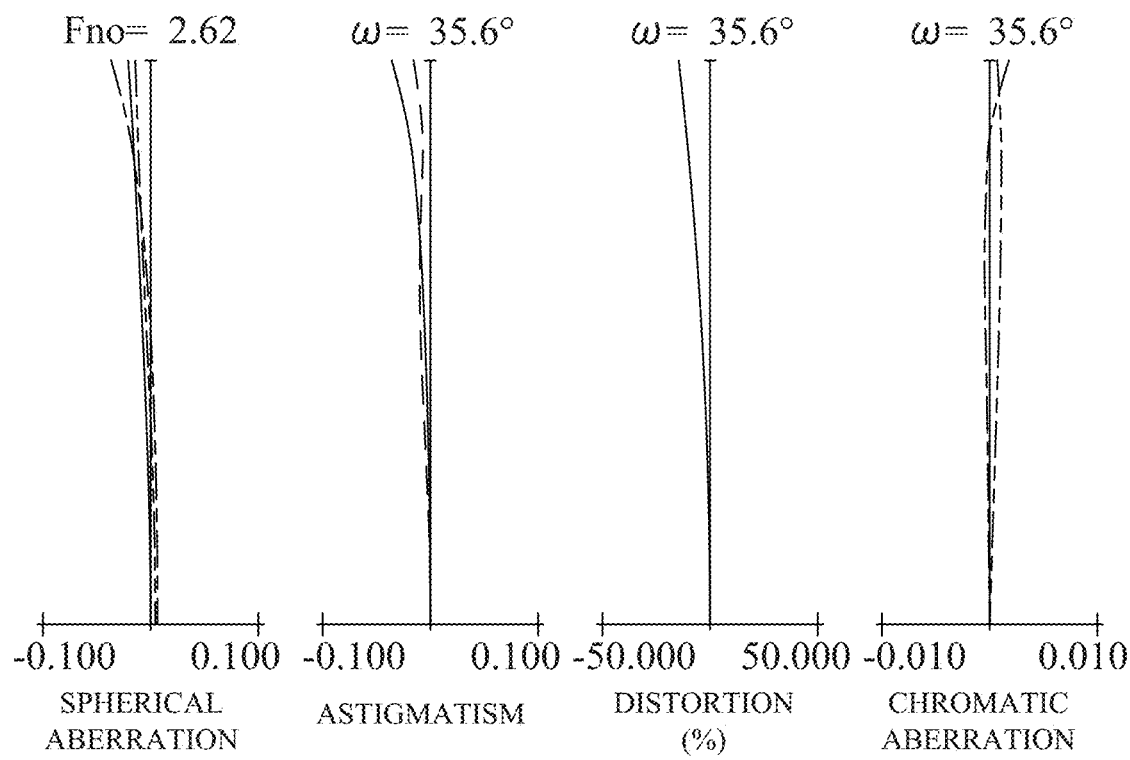
Figure 14C:
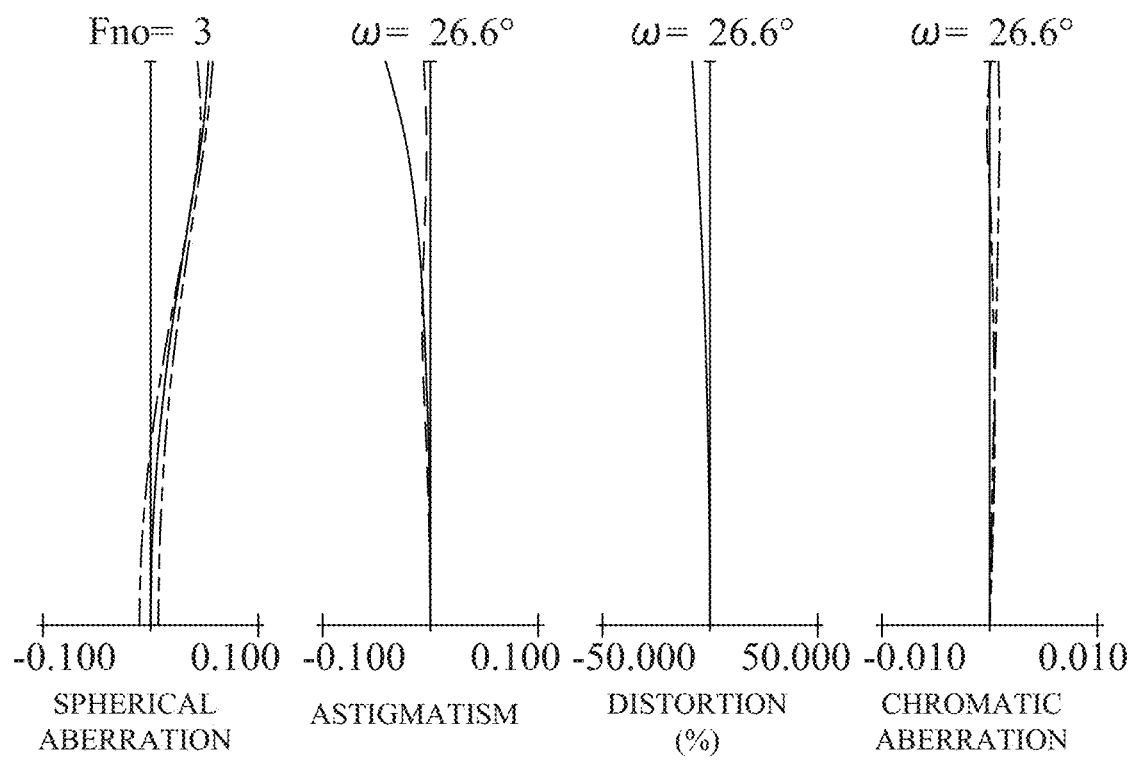
Figure 15:
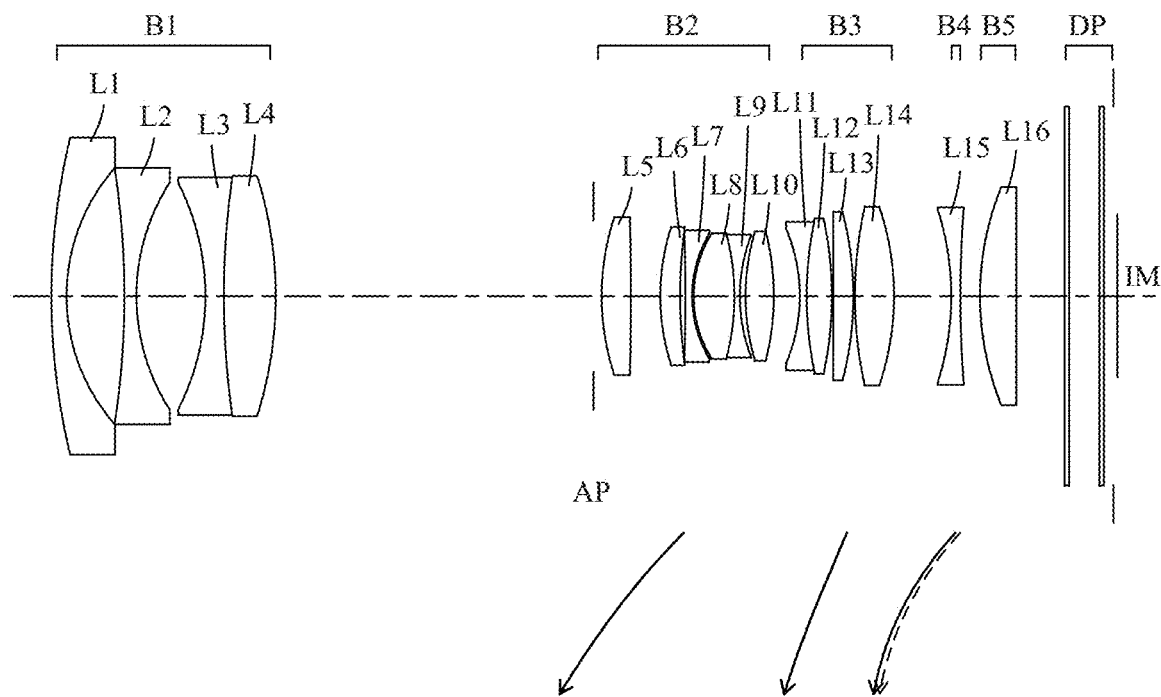
FIG. 15 is a sectional view of a zoom lens according to Example 8.
Figure 16A:
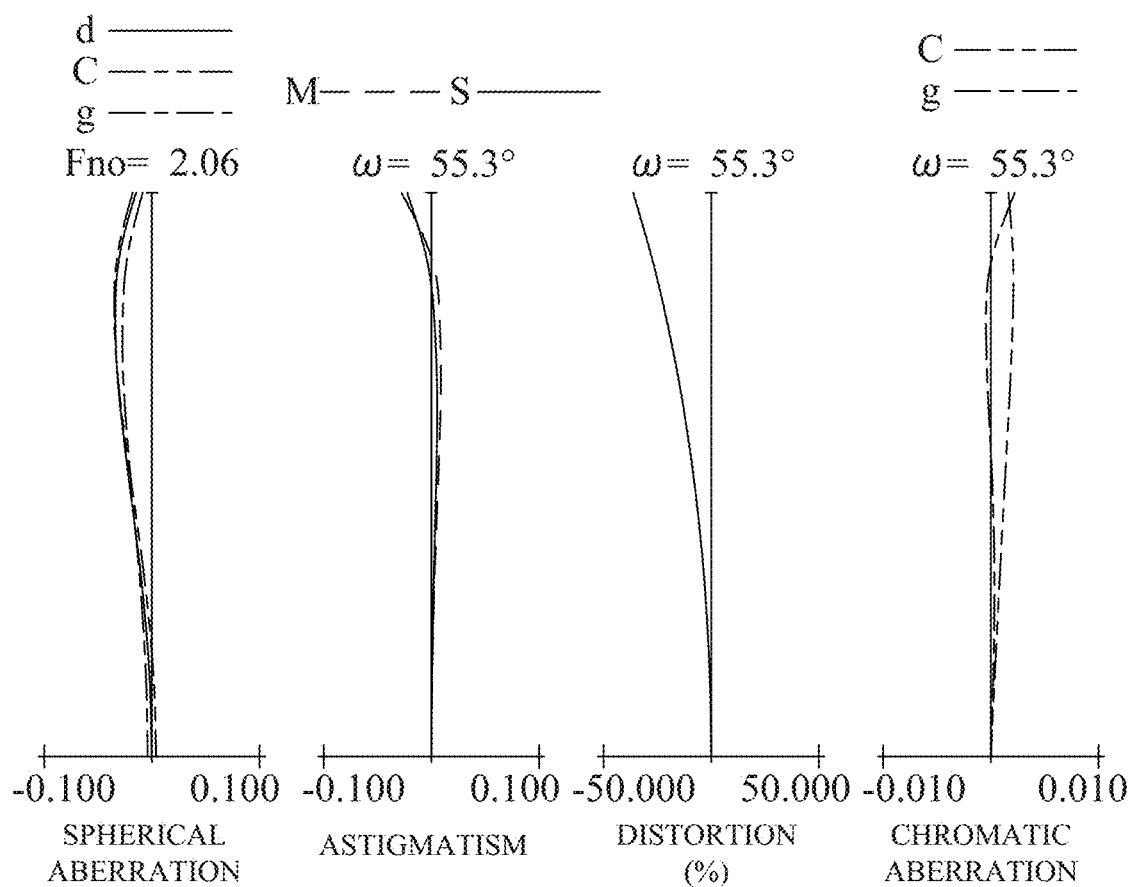
FIGS. 16A, 16B, and 16C are aberration diagrams of the zoom lens according to Example 8 at a wide-angle end, an intermediate focal length, and a telephoto end.
Figure 16B:
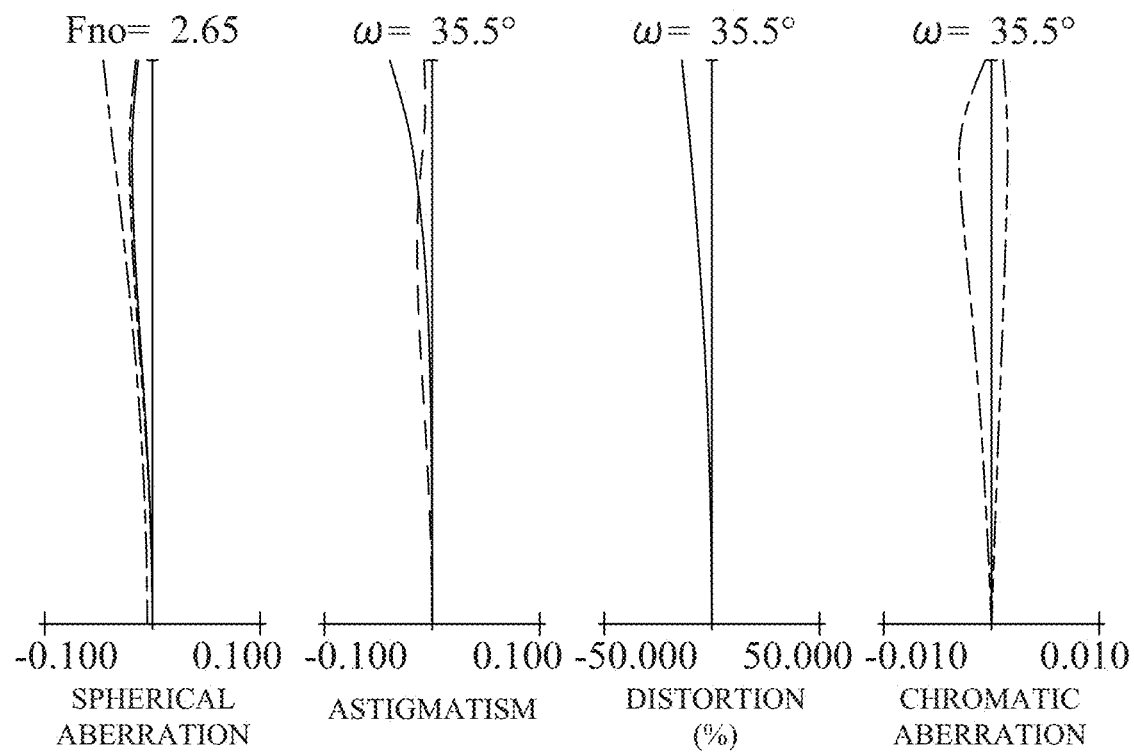
Figure 16C:
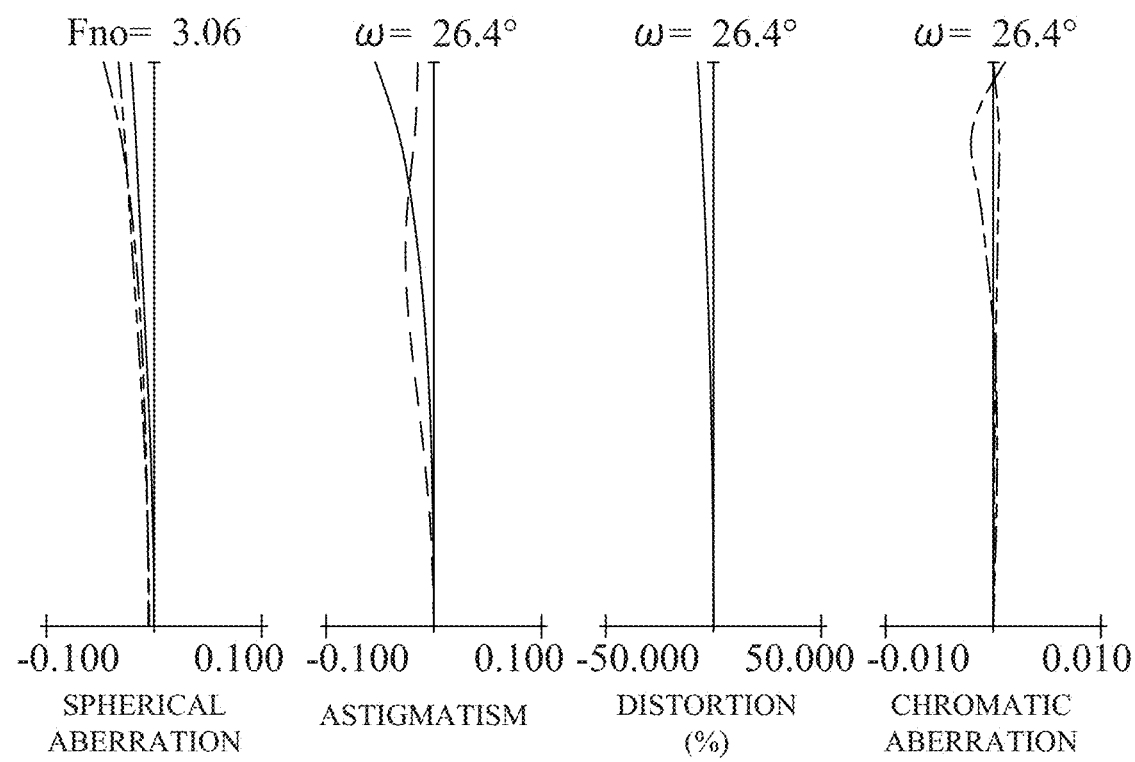

Referring now to the accompanying drawings, a description will be given of embodiments according to the disclosure. A description will now be given of matters common to each example prior to a specific description according to Examples 1 to 8.

In the zoom lens according to each example, the lens unit is a group of one or more lenses that move together during magnification variation (zooming) between a wide-angle end and a telephoto end. That is, distances between adjacent lens units change during zooming. The lens unit may include an aperture stop. The wide-angle and telephoto ends are zoom states of a maximum angle of view (shortest focal length) and a minimum angle of view (longest focal length), respectively, in a case where the lens units that move during zooming are positioned at both ends of a mechanically or controllably movable range on the optical axis.

The zoom lens according to each example is a negative lead type zoom lens that includes, in order from the object side to the image side, a first lens unit having negative refractive power, a second lens unit having positive refractive power, and a rear group that includes one or more lens units, and has a configuration suitable for a wider angle of view. During zooming (magnification variation), the first lens unit does not move and distances between adjacent lens units change. That is, the lens units after the second lens unit have the zooming action and correct changes in various aberrations during zooming and image plane movement along with zooming. More specifically, the second lens unit is mainly responsible for zooming, and at least one focus lens unit among the lens units included in the rear group is mainly responsible for the correction of the image plane movement. The focus lens unit also moves during focusing on an object located at each distance. Among the rear group, the lens units other than the focus lens unit correct aberration changes during zooming with higher accuracy.

The zoom lens according to each example satisfies the following inequality (1):

$$1.9 \leq ft/fw \leq 4.0 \tag{1}$$

where fw is a focal length at the wide-angle end of the zoom lens, and ft is a focal length at the telephoto end of the zoom lens.

ft/fw in inequality (1) represents a zoom ratio of the zoom lens. In a case where ft/fw becomes lower than the lower limit of inequality (1), a focal length range that can be changed is too narrow, and the zoom lens function deteriorates. In a case where ft/fw becomes higher than the upper limit of inequality (1), the focal length at the telephoto end becomes too long, and the optical performance at the telephoto end deteriorates.

In order to reduce the size of the zoom lens, a moving amount of the second lens unit, which is mainly responsible for zooming, may be reduced during zooming and the second lens unit may have strong refractive power strong (or a short focal length). In order to achieve excellent optical performance, the refractive power (focal length) of the first lens unit, which has a refractive power opposite in sign to that of the second lens unit and cancels aberrations with the second lens unit, may also be changed. Each example satisfies the following inequality (2):

$$-0.85 \leq f1/f2 \leq -0.55 \tag{2}$$

where f1 is the focal length of the first lens unit, and f2 is the focal length of the second lens unit.

Thereby, the refractive power of the second lens unit can be increased, the zoom lens can become small, and excellent optical performance is obtained. In a case where f1/f2 becomes lower than the lower limit of inequality (2), the absolute value of the refractive power of the first lens unit becomes too small, the aberrations generated in the second lens unit cannot be canceled and sufficiently corrected, and optical performance deteriorates. In a case where f1/f2 becomes higher than the upper limit of inequality (2), the absolute value of the refractive power of the first lens unit becomes too large and causes overcorrection, and optical performance deteriorates.

Here, in a case where inequality (2) is satisfied while the refractive power of the second lens unit is increased, the absolute value of the refractive power of the first lens unit is also increased accordingly. Since the first lens unit has negative refractive power, increasing the absolute value of the refractive power of the first lens unit also increases the absolute value of the refractive power of the negative lens included in the first lens unit. In a case where the first lens unit includes a single negative lens, the absolute value of the refractive power of this negative lens is increased, a curvature of the lens surface is increased (a radius of curvature is decreased) in this negative lens, and spherical aberration and coma are particularly increased. Therefore, in order to achieve excellent optical performance, the number of negative lenses included in the first lens unit may be two or more.

In each example, since the first lens unit does not move during zooming, for example, longitudinal chromatic aberration generated in the first lens unit is magnified at the telephoto end due to the zooming action of the lens units after the second lens unit. Thus, the chromatic aberration of the first lens unit may be reduced. Accordingly, the following inequality (3) is satisfied:

$$62 \leq vd1n\_ave \leq 95 \tag{3}$$

where vd1n_ave is an average Abbe number of all negative lenses included in the first lens unit based on the d-line. Satisfying this inequality can achieve excellent optical performance.

An Abbe number for the d-line (simply referred to as the Abbe number in the following description) vd is expressed as follows:

$$vd=(nd-1)/(nF-nC)$$

where nd, nF, and nC are refractive indexes based on the d-line (with a wavelength of 587.6 nm), the F-line (with a wavelength of 486.1 nm), and the C-line (with a wavelength of 656.3 nm) in the Fraunhofer line, respectively.

An Abbe number vd1n_i of an i-th negative lens counted from the object side among the negative lenses included in the first lens unit is expressed as follows:

$$vd1n\_ave = \frac{1}{N} \sum_{i=0}^{N} vd1n\_i$$

where N is the number of the negative lenses included in the first lens unit.

In a case where the first lens unit includes a cemented lens, the single lens is defined as a negative lens if the single lens has negative refractive power in an uncemented state.

The first lens unit has negative refractive power and thus may reduce the dispersions of the negative lenses included in the first lens unit as a whole in order to reduce chromatic aberration. In a case where vd1n_ave becomes lower than the lower limit of inequality (3), the dispersions of the negative lenses included in the first lens unit as a whole become too high, and chromatic aberration increases. In a case where vd1n_ave becomes higher than the upper limit of inequality (3), substantially no glass materials can be selected.

Inequalities (1) to (3) may be replaced with the following inequalities (1a) to (3a):

$$1.94 \leq ft/fw \leq 3.50 \tag{1a}$$

$$-0.84 \leq f1/f2 \leq -0.60 \tag{2a}$$

$$64 \leq vd1n\_ave \leq 90 \tag{3a}$$

Inequalities (1) to (3) may be replaced with the following inequalities (1b) to (3b):

$$1.98 \leq ft/fw \leq 3.00 \tag{1b}$$

$$-0.83 \leq f1/f2 \leq -0.65 \tag{2b}$$

$$65 \leq vd1n\_ave \leq 85 \tag{3b}$$

The zoom lens according to each example further satisfies at least one of the following inequalities.

The following inequality (4) may be satisfied:

$$58 \leq vd2p\_ave \leq 80 \tag{4}$$

where vd2p_ave is an average value of the Abbe numbers of all the positive lenses included in the second lens unit.

The second lens unit has positive refractive power, and thus positive lenses included in the second lens unit as a whole may have low dispersions. The second lens unit is mainly responsible for zooming and significantly moves during zooming. Therefore, reducing chromatic aberration generated in the second lens unit can further reduce fluctuations in chromatic aberration during zooming. An Abbe number vd2p_i of the i-th positive lens counted from the object side among N positive lenses included in the second lens unit is expressed as follows:

$$vd2p\_ave = \frac{1}{N}\sum_{i=0}^{N} vd2p\_i$$

where N is the number of positive lenses included in the second lens unit.

In a case where the second lens unit includes a cemented lens, the single lens is defined as a positive lens if the single lens has positive refractive power in an uncemented state. In a case where vd2p_ave becomes lower than the lower limit of inequality (4), the dispersions of the positive lenses included in the second lens unit as a whole become too high and chromatic aberration increases. In a case where vd2p_ave is higher than the upper limit of inequality (4), this state is beneficial to reducing chromatic aberration. However, low-dispersion glass materials generally have low refractive indices, thus the refractive indices of the positive lenses included in the second lens unit substantially decrease as a whole, and spherical aberration and coma increase.

The first lens unit may include two or more negative lenses having an Abbe number of 75 or higher. Thereby, the first lens unit can easily satisfy inequality (3). In this case, the following inequality (5) may be satisfied:

$$1.10 \leq f1n\_ave/f1 \leq 4.00 \quad (5)$$

f1n_ave is an average focal length of two or more negative lenses having an Abbe number of 75 or higher included in the first lens unit.

The average focal length f1n_ave is expressed as follows:

$$f1n\_ave = \left(\frac{1}{N}\sum_{i=0}^{N} \frac{1}{f1n\_i}\right)^{-1}$$

where N is the number of negative lenses with an Abbe number of 75 or higher included in the first lens unit, and f1n_i is a focal length of an i-th negative lens counted from the object side among the N negative lenses.

In a case where f1n_ave/f1 becomes lower than the lower limit of inequality (5), the absolute value of the refractive power of the low-dispersion negative lens among the negative lenses included in the first lens unit becomes too large, and chromatic aberration increases. In a case where f1n_ave/f1 becomes higher than the upper limit of inequality (5), the absolute value of the refractive power of the low-dispersion negative lens among the negative lenses included in the first lens unit becomes small, so a ratio of the high-dispersion negative lens increases and consequently chromatic aberration increases.

In order to further reduce aberrations, at least one of the negative lenses having an Abbe number of 75 or higher included in the first lens unit may be cemented with a positive lens. In this case, the following inequality (6) may be satisfied:

$$20 \leq vd1p \leq 40 \quad (6)$$

where vd1p is an Abbe number of the positive lens cemented with the negative lens.

In a case where vd1p becomes lower than the lower limit of inequality (6), the dispersion of the positive lens cemented with the negative lens becomes too high and chromatic aberration increases. In a case where vd1p becomes higher than the upper limit of inequality (6), the dispersion of the positive lens cemented with the negative lens becomes too low, and it becomes difficult to obtain the effect of canceling and correcting the chromatic aberration generated by the negative lens.

The second lens unit may include two or more positive lenses having an Abbe number of 75 or higher. Thereby, the second lens unit can easily satisfy inequality (4). In this case, the following inequality (7) may be satisfied:

$$0.30 \leq f2p\_ave/f2 \leq 3.00 \quad (7)$$

where f2p_ave is an average focal length of two or more positive lenses having an Abbe number of 75 or higher included in the second lens unit.

The average focal length f2p_ave is expressed as follows:

$$f2p\_ave = \left(\frac{1}{N}\sum_{i=0}^{N} \frac{1}{f2p\_i}\right)^{-1}$$

where N is the number of positive lenses having Abbe numbers of 75 or higher included in the second lens unit, and f2p_i is a focal length of an i-th positive lens counted from the object side among the N positive lenses.

In a case where f2p_ave/f2 becomes lower than the lower limit of inequality (7), the refractive power of the low-dispersion positive lens among the positive lenses included in the second lens unit becomes too large, and chromatic aberration increases. In a case where f2p_ave/f2 becomes higher than the upper limit of inequality (7), the refractive power of the low-dispersion positive lens among the positive lenses included in the second lens unit decreases, a ratio of the high-dispersion positive lenses increases, and consequently chromatic aberration increases.

In order to further reduce chromatic aberration, at least one of the two or more positive lenses having an Abbe number of 75 or higher included in the second lens unit may be cemented with a negative lens. In this case, the following inequality (8) may be satisfied:

$$20 \leq vd2n \leq 40 \quad (8)$$

where vd2n is an Abbe number of the negative lens cemented with the positive lens.

In a case where vd2n becomes lower than the lower limit of inequality (8), the dispersion of the negative lens cemented with the positive lens becomes too high and chromatic aberration increases. In a case where vd2n becomes higher than the upper limit of inequality (8), the dispersion of the negative lens cemented with the positive lens becomes too low, and it becomes difficult to obtain the effects of canceling out and correcting chromatic aberration generated in the positive lens.

Inequalities (5) to (8) may be replaced with the following inequalities (5a) to (8a):

$$59 \leq vd2p\_ave \leq 75 \quad (4a)$$

$$1.30 \leq f1n\_ave/f1 \leq 3.50 \quad (5a)$$

$$25 \leq vd1p \leq 36 \quad (6a)$$

$$0.40 \leq f2p\_ave/f2 \leq 2.50 \quad (7a)$$

$$24 \leq vd2n \leq 38 \quad (8a)$$

Inequalities (5) to (8) may be replaced with the following inequalities (5b) to (8b):

$$60 \leq \nu d2p\_ave \leq 70 \quad (4b)$$

$$1.50 \leq f1n\_ave/f1 \leq 3.00 \quad (5b)$$

$$28 \leq \nu d1p \leq 34 \quad (6b)$$

$$0.50 \leq f2p\_ave/f2 \leq 2.00 \quad (7b)$$

$$27 \leq \nu d2n \leq 36 \quad (8b)$$

Examples 1 to 8 will be explained below. FIGS. 1, 3, 5, 7, 9, 11, 13, and 15 respectively illustrate sections at the wide-angle end of the zoom lenses according to Examples 1 to 8 (numerical examples 1 to 8 to be described below). Bi (i=1, 2, 3, ... ) represents an i-th lens unit counted from the object side to the image side, and AP represents an aperture stop. Li represents an i-th lens counted from the object side to the image side. DP represents a glass block such as a cover glass, a low-pass filter, and an IR (infrared light) cut filter provided to an image sensor such as a CCD sensor or a CMOS sensor. IM represents an image plane. A light receiving plane (imaging plane) of the image sensor is disposed on the image plane IM. A photosensitive plane (film plane) of a film may be disposed on the image plane IM.

In a surveillance camera that can switch between a daytime imaging mode and a nighttime imaging mode, an IR cut filter or visible light cut filter is inserted and removed by an unillustrated insertion/removal mechanism according to the imaging mode.

Each of the zoom lenses according to Examples 1 to 4, 6, 7, and 8 includes, in order from the object side to the image side, a first lens unit B1 having negative refractive power, a second lens unit B2 having positive refractive power, and a rear group (third to fifth lens units B3 to B5) including three lens units. The third, fourth, and fifth lens units B3, B4, and B5 have positive refractive power, negative refractive power, and positive refractive power, respectively. The zoom lens according to Example 5 includes, in order from the object side to the image side, a first lens unit B1 having negative refractive power, a second lens unit B2 having positive refractive power, and a rear group that includes four lens units (third to sixth lens units B3 to B6). The third, fourth, fifth and sixth lens units B3, B4, B5, and B6 have positive refractive power, positive refractive power, negative refractive power, and positive refractive power, respectively.

In the zoom lens according to each example, the first lens unit B1 does not move (is fixed) during zooming, and distances between adjacent lens units change during zooming. The arrows below the moving lens units in each figure represent their moving loci during zooming from the wide-angle end to the telephoto end. Solid and broken arrows below the fourth lens unit B4 according to Examples 1 to 4, 6, 7, and 8 and the fifth lens unit B5 according to Example 5 represent their moving loci for correcting image plane fluctuations along with zooming in a case where infinity and short distance objects are in focus, respectively.

The fourth lens unit B4 in Examples 1 to 4, 6, 7, and 8 and the fifth lens unit B5 in Example 5 also serve as a focus lens unit, and move during focusing. Of the lens units included in the rear group, the lens unit having negative refractive power as the focus lens unit can reduce a moving amount of the focus lens unit during focusing and the size of the zoom lens.

In Examples 1 to 7, the first lens unit B1 includes negative lenses L1, L2, L3, and L5 and a positive lens L4. In Example 8, the first lens unit B1 includes negative lenses L1, L2, and L3 and a positive lens L4.

In Examples 1 to 6, the second lens unit B2 includes positive lenses L6, L7, L9, and L11 and negative lenses L8 and L10. In Example 7, the second lens unit B2 includes positive lenses L6, L7, L9, L10, and L12 and negative lenses L8 and L11. In Example 8, the second lens unit B2 includes positive lenses L5, L6, L8, and L10 and negative lenses L7 and L9.

In Examples 1, 2, 3, 4, and 6, the third lens unit B3 includes a negative lens L12 and positive lenses L13, L14, and L15. In Example 5, the third lens unit B3 includes a negative lens L12 and positive lenses L13 and L14. In Example 7, the third lens unit B3 includes a negative lens L13 and positive lenses L14, L15, and L16. In Example 8, the third lens unit B3 includes a negative lens L11 and positive lenses L12, L13, and L14.

In Examples 1, 2, 3, 4, and 6, the fourth lens unit B4 includes a negative lens L16. In Example 5, the fourth lens unit B4 includes a positive lens L15. In Example 7, the fourth lens unit B4 includes a negative lens L17. In Example 8, the fourth lens unit B4 includes a negative lens L15.

In Examples 1, 2, 3, 4, and 6, the fifth lens unit B5 includes a positive lens L17. In Example 5, the fifth lens unit B5 includes a negative lens L16. In Example 7, the fifth lens unit B5 includes a positive lens L18. In Example 8, the fifth lens unit B5 includes a positive lens L16.

In Example 5, the sixth lens unit B6 includes a positive lens L17.

Tables 1 to 8 illustrate various values in numerical examples 1 to 8 corresponding to Examples 1 to 8, respectively. In each numerical example, f denotes a focal length (mm) of the zoom lens at the wide-angle end, intermediate focal length, and telephoto end, Fno denotes an F-number, and ω denotes a half angle of view (°). A zoom ratio of the zoom lens in each numerical example is 2.00 or 2.80.

A surface number i represents the order of the surfaces counted from the object side. r represents a paraxial radius of curvature (mm) of an i-th surface from the object side, and d represents a distance (lens thickness or air distance) (mm) between i-th and (i+1)-th surfaces. nd is a refractive index for the d-line of the optical material between i-th and (i+1)-th surfaces. νd is an Abbe number based on the d-line of the optical material between i-th surface and the (i+1)-th surface. AP represents an aperture stop. Also illustrated are distances (mm) between adjacent lens units at the wide-angle end, intermediate focal length, and telephoto end.

In Table 8, an asterisk * attached to the left side of the surface number represents that the surface has an aspherical shape expressed by the following equation:

$$z = \frac{\frac{y^2}{r}}{1 + \sqrt{1 - (1+k)\left(\frac{y}{r}\right)^2}} + \sum_{j=1}^{16} B_j y^j$$

where y is a radial distance from the optical axis, z is a sag amount in the optical axis direction, r is a paraxial radius of curvature, k is a conic coefficient, and Bj is an aspheric coefficient. The sign of z is positive in a direction from the object side to the image plane. In the aspheric coefficients, "E±x" means "×10$^{\pm x}$." All aspherical coefficients not illustrated are zero.

Table 9 illustrates a relationship between numerical values and inequalities in each numerical example. The average focal length f1n_ave of the negative lenses having an Abbe number of 75 or higher among the negative lenses included in the first lens unit B1 is a value calculated with the negative lenses L2, L3, and L5 in numerical examples 1, 2, 3, 6, and 7. The average focal length f1n_ave of the negative lenses having an Abbe number of 75 or higher among the negative lenses included in the first lens unit B1 is a value calculated with the negative lenses L3 and L5 in numerical examples 4 and 5. The average focal length f1n_ave of the negative lenses having an Abbe number of 75 or higher among the negative lenses included in the first lens unit B1 is a value calculated with the negative lenses L2 and L3 in numerical example 8.

The average focal length f2p_ave of the positive lenses having an Abbe number of 75 or higher among the positive lenses included in the second lens unit B2 is a value calculated with the positive lenses L9 and L11 in numerical examples 1 to 6. The average focal length f2p_ave of the positive lenses having an Abbe number of 75 or higher among the positive lenses included in the second lens unit B2 is a value with the positive lenses L7, L10, and L11 in numerical example 7. The average focal length f2p_ave of the positive lenses having an Abbe number of 75 or higher among the positive lenses included in the second lens unit B2 is a value with the positive lenses L8 and L10 in numerical example 8.

The Abbe number v1p of the positive lens to be cemented with the negative lens among the negative lenses having the Abbe number of 75 or higher included in the first lens unit B1 is an Abbe number of the positive lens L4 in each numerical example.

The Abbe number v2n of the negative lens to be cemented with the positive lens among the positive lenses having an Abbe number of 75 or higher included in the second lens unit B2 is an Abbe number of the negative lens L10 in numerical examples 1 to 6. The Abbe number v2n of the negative lens to be cemented with the positive lens among the positive lenses having an Abbe number of 75 or higher included in the second lens unit B2 is an Abbe number of the negative lens L11 in numerical example 7. The Abbe number v2n of the negative lens to be cemented with the positive lens among the positive lenses having an Abbe number of 75 or higher included in the second lens unit B2 is an Abbe number of the negative lens L9 in numerical example 8.

FIGS. 2, 4, 6, 8, 10, 12, 14, and 16 illustrate various aberrations (spherical aberration, astigmatism, distortion, and chromatic aberration). In the spherical aberration diagram, Fno represents an F-number, and a solid line represents a spherical aberration amount for the d-line (with a wavelength of 587.6 nm), an alternate long and two short dashes line represents a spherical aberration amount for the C-line (with a wavelength of 656.3 nm), and an alternate long and short dash line represents a spherical aberration amount for the g-line (with a wavelength of 435.8 nm), respectively. In the astigmatism diagram, ω is a half angle of view (°), a solid line S represents an astigmatism amount on a sagittal image plane, and a dashed line M represents an astigmatism amount on a meridional image plane. The distortion diagram illustrates a distortion amount for the d-line. A chromatic aberration diagram illustrates lateral chromatic aberration amounts for the C-line and the g-line.

TABLE 1

| | | WIDE-ANGLE END | INTERMEDIATE | TELEPHOTO END |
|---|---|---|---|---|
| | f | 11.71 | 17.57 | 23.43 |
| | Fno | 2.06 | 2.67 | 3.07 |
| | ω | 55.6 | 35.6 | 26.6 |
| | ZOOM RATIO | | 2.00 | |

| | SURFACE NO | PARAXIAL RADIUS OF CURVATURE r [mm] | SURFACE DISTANCE d [mm] | REFRACTIVE INDEX nd | ABBE NUMBER vd |
|---|---|---|---|---|---|
| | 1 | 109.33 | 2.00 | 1.734 | 51.47 |
| | 2 | 23.20 | 7.26 | — | — |
| | 3 | ∞ | 1.60 | 1.497 | 81.55 |
| | 4 | 26.59 | 8.18 | — | — |
| | 5 | −42.58 | 1.50 | 1.497 | 81.55 |
| | 6 | 59.20 | 6.10 | 1.916 | 31.60 |
| | 7 | −44.45 | 0.49 | — | — |
| | 8 | −37.42 | 1.50 | 1.497 | 81.55 |
| | 9 | ∞ | VARIABLE | — | — |
| AP | 10 | ∞ | 0.95 | — | — |
| | 11 | 31.12 | 3.40 | 2.0010 | 29.14 |
| | 12 | −321.98 | 0.50 | — | — |
| | 13 | 28.98 | 3.00 | 1.729 | 54.68 |
| | 14 | 95.53 | 0.57 | — | — |
| | 15 | ∞ | 0.83 | 1.738 | 32.33 |
| | 16 | 18.35 | 1.28 | — | — |
| | 17 | 22.79 | 5.00 | 1.497 | 81.55 |
| | 18 | −27.17 | 0.72 | 1.738 | 32.33 |
| | 19 | 34.11 | 1.94 | — | — |
| | 20 | 66.58 | 2.90 | 1.497 | 81.55 |
| | 21 | −37.27 | VARIABLE | — | — |
| | 22 | −21.82 | 0.92 | 1.855 | 24.80 |
| | 23 | 43.20 | 5.00 | 1.497 | 81.55 |
| | 24 | −31.59 | 0.20 | — | — |
| | 25 | ∞ | 2.30 | 2.0010 | 29.14 |

TABLE 1-continued

| | | | | |
|---|---|---|---|---|
| 26 | −54.06 | 0.20 | — | — |
| 27 | 48.96 | 6.40 | 1.439 | 94.66 |
| 28 | −39.86 | VARIABLE | — | — |
| 29 | −39.00 | 1.20 | 1.516 | 64.14 |
| 30 | −551.78 | VARIABLE | — | — |
| 31 | 41.57 | 6.00 | 1.959 | 17.47 |
| 32 | ∞ | 6.70 | — | — |
| 33 | ∞ | 0.60 | 1.516 | 64.14 |
| 34 | ∞ | 4.00 | — | — |
| 35 | ∞ | 0.60 | 1.516 | 64.14 |
| 36 | ∞ | 1.59 | — | — |

VARIABLE SURFACE DISTANCE d[mm]

| SURFACE NO | WIDE-ANGLE END | INTERMEDIATE | TELEPHOTO END |
|---|---|---|---|
| 9 | 30.22 | 15.93 | 4.50 |
| 21 | 3.42 | 8.80 | 12.70 |
| 28 | 6.02 | 4.46 | 11.92 |
| 30 | 3.43 | 13.89 | 13.97 |

TABLE 2

| | WIDE-ANGLE END | INTERMEDIATE | TELEPHOTO END |
|---|---|---|---|
| f | 11.58 | 22.01 | 32.41 |
| Fno | 2.05 | 2.97 | 3.43 |
| ω | 55.1 | 27.9 | 18.9 |
| ZOOM RATIO | | 2.80 | |

| | SURFACE NO | PARAXIAL RADIUS OF CURVATURE r [mm] | SURFACE DISTANCE d [mm] | REFRACTIVE INDEX nd | ABBE NUMBER vd |
|---|---|---|---|---|---|
| | 1 | 83.52 | 2.00 | 1.892 | 37.13 |
| | 2 | 22.75 | 9.24 | — | — |
| | 3 | −83.93 | 1.60 | 1.497 | 81.55 |
| | 4 | 38.18 | 6.91 | — | — |
| | 5 | −48.02 | 1.50 | 1.497 | 81.55 |
| | 6 | 75.31 | 6.20 | 1.916 | 31.60 |
| | 7 | −43.77 | 0.36 | — | — |
| | 8 | −39.01 | 1.50 | 1.497 | 81.55 |
| | 9 | −138.24 | VARIABLE | — | — |
| AP | 10 | ∞ | 0.20 | — | — |
| | 11 | 35.51 | 4.00 | 2.0010 | 29.14 |
| | 12 | −989.45 | 3.75 | — | — |
| | 13 | 25.11 | 2.57 | 1.729 | 54.68 |
| | 14 | 74.56 | 0.98 | — | — |
| | 15 | 216.57 | 1.07 | 1.738 | 32.33 |
| | 16 | 19.14 | 0.50 | — | — |
| | 17 | 25.37 | 3.78 | 1.497 | 81.55 |
| | 18 | −30.79 | 1.50 | 1.738 | 32.33 |
| | 19 | 28.50 | 0.26 | — | — |
| | 20 | 36.60 | 3.55 | 1.497 | 81.55 |
| | 21 | −36.94 | VARIABLE | — | — |
| | 22 | −23.36 | 0.90 | 1.855 | 24.80 |
| | 23 | 39.49 | 3.84 | 1.497 | 81.55 |
| | 24 | −34.54 | 1.91 | — | — |
| | 25 | 364.18 | 2.16 | 2.0010 | 29.14 |
| | 26 | −63.65 | 0.20 | — | — |
| | 27 | 55.22 | 4.96 | 1.439 | 94.66 |
| | 28 | −34.70 | VARIABLE | — | — |
| | 29 | −32.66 | 2.00 | 1.516 | 64.14 |
| | 30 | 125.03 | VARIABLE | — | — |
| | 31 | 39.93 | 6.00 | 1.959 | 17.47 |
| | 32 | ∞ | 5.55 | — | — |
| | 33 | ∞ | 0.60 | 1.516 | 64.14 |
| | 34 | ∞ | 4.00 | — | — |
| | 35 | ∞ | 0.60 | 1.516 | 64.14 |
| | 36 | ∞ | 2.10 | — | — |

TABLE 2-continued

| | VARIABLE SURFACE DISTANCE d[mm] | | |
|---|---|---|---|
| SURFACE NO | WIDE-ANGLE END | INTERMEDIATE | TELEPHOTO END |
| 9 | 39.05 | 16.79 | 1.50 |
| 21 | 1.95 | 8.97 | 14.01 |
| 28 | 6.07 | 2.35 | 9.17 |
| 30 | 1.66 | 20.62 | 24.05 |

TABLE 3

| | | WIDE-ANGLE END | INTERMEDIATE | | TELEPHOTO END |
|---|---|---|---|---|---|
| f | | 11.68 | 17.51 | | 23.36 |
| Fno | | 2.06 | 2.62 | | 3.00 |
| ω | | 55.3 | 35.6 | | 26.6 |
| ZOOM RATIO | | | 2.00 | | |

| | SURFACE NO | PARAXIAL RADIUS OF CURVATURE r [mm] | SURFACE DISTANCE d [mm] | REFRACTIVE INDEX nd | ABBE NUMBER vd |
|---|---|---|---|---|---|
| | 1 | 95.67 | 2.00 | 1.734 | 51.47 |
| | 2 | 23.66 | 7.20 | — | — |
| | 3 | ∞ | 1.60 | 1.528 | 76.45 |
| | 4 | 26.05 | 8.48 | — | — |
| | 5 | −45.57 | 2.50 | 1.528 | 76.45 |
| | 6 | 76.19 | 6.60 | 2.0010 | 29.14 |
| | 7 | −51.84 | 0.44 | — | — |
| | 8 | −43.08 | 1.57 | 1.497 | 81.55 |
| | 9 | ∞ | VARIABLE | — | — |
| AP | 10 | ∞ | 0.95 | — | — |
| | 11 | 31.47 | 3.44 | 2.0010 | 29.14 |
| | 12 | −236.61 | 0.50 | — | — |
| | 13 | 26.70 | 3.19 | 1.729 | 54.68 |
| | 14 | 77.97 | 0.51 | — | — |
| | 15 | ∞ | 1.12 | 1.738 | 32.33 |
| | 16 | 18.23 | 1.30 | — | — |
| | 17 | 23.12 | 4.59 | 1.497 | 81.55 |
| | 18 | −32.75 | 0.72 | 1.789 | 28.43 |
| | 19 | 33.12 | 1.94 | — | — |
| | 20 | 68.98 | 2.82 | 1.528 | 76.45 |
| | 21 | −38.33 | VARIABLE | — | — |
| | 22 | −22.32 | 1.07 | 1.855 | 24.80 |
| | 23 | 44.12 | 4.94 | 1.528 | 78.45 |
| | 24 | −33.27 | 0.20 | — | — |
| | 25 | ∞ | 2.19 | 2.0010 | 29.14 |
| | 26 | −58.17 | 0.20 | — | — |
| | 27 | 44.45 | 6.19 | 1.439 | 94.66 |
| | 28 | −46.34 | VARIABLE | — | — |
| | 29 | −35.82 | 1.20 | 1.516 | 64.14 |
| | 30 | −381.90 | VARIABLE | — | — |
| | 31 | 37.74 | 6.00 | 1.959 | 17.47 |
| | 32 | ∞ | 5.25 | — | — |
| | 33 | ∞ | 0.60 | 1.516 | 64.14 |
| | 34 | ∞ | 4.00 | — | — |
| | 35 | ∞ | 0.60 | 1.516 | 64.14 |
| | 36 | ∞ | 2.09 | — | — |

| | VARIABLE SURFACE DISTANCE d[mm] | | |
|---|---|---|---|
| SURFACE NO | WIDE-ANGLE END | INTERMEDIATE | TELEPHOTO END |
| 9 | 29.64 | 15.67 | 4.50 |
| 21 | 3.45 | 8.77 | 12.70 |
| 28 | 6.03 | 4.38 | 11.49 |
| 30 | 3.40 | 13.70 | 13.82 |

TABLE 4

|  | WIDE-ANGLE END | INTERMEDIATE | TELEPHOTO END |
|---|---|---|---|
| f | 11.50 | 17.25 | 23.01 |
| Fno | 2.06 | 2.62 | 3.00 |
| ω | 54.8 | 35.9 | 26.9 |
| ZOOM RATIO | | 2.00 | |

| | SURFACE NO | PARAXIAL RADIUS OF CURVATURE r [mm] | SURFACE DISTANCE d [mm] | REFRACTIVE INDEX nd | ABBE NUMBER vd |
|---|---|---|---|---|---|
| | 1 | 70.49 | 2.00 | 1.734 | 51.47 |
| | 2 | 21.76 | 7.79 | — | — |
| | 3 | ∞ | 1.60 | 1.595 | 67.74 |
| | 4 | 26.31 | 7.95 | — | — |
| | 5 | −46.70 | 1.90 | 1.528 | 76.45 |
| | 6 | 47.59 | 6.57 | 1.916 | 31.60 |
| | 7 | −46.42 | 0.42 | — | — |
| | 8 | −39.72 | 1.50 | 1.497 | 81.55 |
| | 9 | ∞ | VARIABLE | — | — |
| AP | 10 | ∞ | 0.95 | — | — |
| | 11 | 30.50 | 3.44 | 2.0010 | 29.14 |
| | 12 | −333.35 | 0.50 | — | — |
| | 13 | 28.00 | 3.00 | 1.729 | 54.68 |
| | 14 | 77.26 | 0.51 | — | — |
| | 15 | ∞ | 0.81 | 1.738 | 32.33 |
| | 16 | 17.97 | 1.23 | — | — |
| | 17 | 21.54 | 5.07 | 1.497 | 81.55 |
| | 18 | −28.19 | 0.72 | 1.738 | 32.33 |
| | 19 | 30.69 | 1.98 | — | — |
| | 20 | 66.83 | 2.89 | 1.528 | 76.45 |
| | 21 | −37.18 | VARIABLE | — | — |
| | 22 | −22.95 | 0.90 | 1.855 | 24.80 |
| | 23 | 37.92 | 4.88 | 1.595 | 67.74 |
| | 24 | −36.51 | 0.20 | — | — |
| | 25 | ∞ | 2.13 | 2.0010 | 29.14 |
| | 26 | −60.66 | 0.20 | — | — |
| | 27 | 50.78 | 6.10 | 1.439 | 94.66 |
| | 28 | −42.18 | VARIABLE | — | — |
| | 29 | −36.71 | 1.20 | 1.516 | 64.14 |
| | 30 | −334.94 | VARIABLE | — | — |
| | 31 | 38.74 | 5.84 | 1.959 | 17.47 |
| | 32 | ∞ | 5.89 | — | — |
| | 33 | ∞ | 0.60 | 1.516 | 64.14 |
| | 34 | ∞ | 4.00 | — | — |
| | 35 | ∞ | 0.60 | 1.516 | 64.14 |
| | 36 | ∞ | 2.09 | — | — |

| VARIABLE SURFACE DISTANCE d[mm] | | | |
|---|---|---|---|
| SURFACE NO | WIDE-ANGLE END | INTERMEDIATE | TELEPHOTO END |
| 9 | 30.01 | 15.76 | 4.50 |
| 21 | 3.45 | 8.95 | 12.74 |
| 28 | 5.84 | 4.61 | 12.22 |
| 30 | 3.76 | 13.74 | 13.59 |

TABLE 5

|  | WIDE-ANGLE END | INTERMEDIATE | TELEPHOTO END |
|---|---|---|---|
| f | 11.66 | 17.49 | 23.33 |
| Fno | 2.06 | 2.60 | 2.95 |
| ω | 55.3 | 35.6 | 26.6 |
| ZOOM RATIO | | 2.00 | |

TABLE 5-continued

| | SURFACE NO | PARAXIAL RADIUS OF CURVATURE r [mm] | SURFACE DISTANCE d [mm] | REFRACTIVE INDEX nd | ABBE NUMBER vd |
|---|---|---|---|---|---|
| | 1 | 107.69 | 2.00 | 1.734 | 51.47 |
| | 2 | 23.53 | 7.08 | — | — |
| | 3 | −3517.39 | 1.60 | 1.595 | 67.74 |
| | 4 | 27.96 | 7.87 | — | — |
| | 5 | −44.30 | 1.51 | 1.528 | 76.45 |
| | 6 | 53.66 | 6.31 | 1.916 | 31.60 |
| | 7 | −45.08 | 0.47 | — | — |
| | 8 | −38.40 | 1.50 | 1.497 | 81.55 |
| | 9 | −227.33 | VARIABLE | — | — |
| AP | 10 | ∞ | 0.95 | — | — |
| | 11 | 30.22 | 3.51 | 2.0010 | 29.14 |
| | 12 | −282.64 | 0.50 | — | — |
| | 13 | 28.87 | 2.97 | 1.729 | 54.68 |
| | 14 | 86.87 | 0.49 | — | — |
| | 15 | −903.43 | 0.81 | 1.738 | 32.33 |
| | 16 | 18.26 | 1.24 | — | — |
| | 17 | 22.16 | 4.99 | 1.497 | 81.55 |
| | 18 | −28.29 | 0.72 | 1.738 | 32.33 |
| | 19 | 30.81 | 2.00 | — | — |
| | 20 | 70.90 | 2.76 | 1.528 | 76.45 |
| | 21 | −39.42 | VARIABLE | — | — |
| | 22 | −21.26 | 0.90 | 1.855 | 24.80 |
| | 23 | 39.62 | 5.38 | 1.595 | 67.74 |
| | 24 | −29.24 | 0.20 | — | — |
| | 25 | 428.12 | 2.04 | 2.0010 | 29.14 |
| | 26 | −77.01 | VARIABLE | — | — |
| | 27 | 58.87 | 5.97 | 1.439 | 94.66 |
| | 28 | −39.50 | VARIABLE | — | — |
| | 29 | −39.21 | 1.20 | 1.516 | 64.14 |
| | 30 | −600.00 | VARIABLE | — | — |
| | 31 | 39.44 | 6.00 | 1.959 | 17.47 |
| | 32 | ∞ | 5.92 | — | — |
| | 33 | ∞ | 0.60 | 1.516 | 64.14 |
| | 34 | ∞ | 4.00 | — | — |
| | 35 | ∞ | 0.60 | 1.516 | 64.14 |
| | 36 | ∞ | 2.09 | — | — |

| | VARIABLE SURFACE DISTANCE d[mm] | | |
|---|---|---|---|
| SURFACE NO | WIDE-ANGLE END | INTERMEDIATE | TELEPHOTO END |
| 9 | 30.81 | 15.98 | 4.00 |
| 21 | 3.45 | 8.33 | 12.86 |
| 26 | 1.00 | 2.59 | 3.00 |
| 28 | 5.68 | 4.50 | 12.20 |
| 30 | 3.40 | 12.44 | 12.27 |

TABLE 6

| | WIDE-ANGLE END | INTERMEDIATE | TELEPHOTO END |
|---|---|---|---|
| f | 11.90 | 17.84 | 23.80 |
| Fno | 2.06 | 2.62 | 3.00 |
| ω | 56.1 | 35.3 | 26.3 |
| ZOOM RATIO | | 2.00 | |

| SURFACE NO | PARAXIAL RADIUS OF CURVATURE r [mm] | SURFACE DISTANCE d [mm] | REFRACTIVE INDEX nd | ABBE NUMBER vd |
|---|---|---|---|---|
| 1 | 153.58 | 2.00 | 1.734 | 51.47 |
| 2 | 24.86 | 7.41 | — | — |
| 3 | −216.98 | 1.60 | 1.439 | 94.66 |
| 4 | 26.28 | 8.36 | — | — |
| 5 | −40.97 | 1.50 | 1.497 | 81.55 |
| 6 | 65.92 | 5.63 | 1.954 | 32.32 |
| 7 | −47.23 | 0.63 | — | — |
| 8 | −37.69 | 1.50 | 1.439 | 94.66 |

TABLE 6-continued

|   | | r | d | nd | vd |
|---|---|---|---|---|---|
| | 9 | −24569.36 | VARIABLE | — | — |
| AP | 10 | ∞ | 0.95 | — | — |
| | 11 | 31.31 | 3.40 | 2.0010 | 29.14 |
| | 12 | −287.83 | 0.50 | — | — |
| | 13 | 27.90 | 3.14 | 1.729 | 54.68 |
| | 14 | 101.12 | 0.42 | — | — |
| | 15 | ∞ | 0.81 | 1.738 | 32.33 |
| | 16 | 17.87 | 1.26 | — | — |
| | 17 | 21.75 | 5.07 | 1.497 | 81.55 |
| | 18 | −27.83 | 0.72 | 1.738 | 32.33 |
| | 19 | 32.05 | 1.94 | — | — |
| | 20 | 63.80 | 3.01 | 1.439 | 94.66 |
| | 21 | −35.48 | VARIABLE | — | — |
| | 22 | −22.13 | 0.92 | 1.855 | 24.80 |
| | 23 | 42.05 | 4.95 | 1.497 | 81.55 |
| | 24 | −32.47 | 0.20 | — | — |
| | 25 | ∞ | 2.27 | 2.0010 | 29.14 |
| | 26 | −55.16 | 0.20 | — | — |
| | 27 | 46.94 | 6.40 | 1.439 | 94.66 |
| | 28 | −41.26 | VARIABLE | — | — |
| | 29 | −40.21 | 1.20 | 1.516 | 64.14 |
| | 30 | −466.75 | VARIABLE | — | — |
| | 31 | 39.76 | 6.00 | 1.959 | 17.47 |
| | 32 | ∞ | 5.67 | — | — |
| | 33 | ∞ | 0.60 | 1.516 | 64.14 |
| | 34 | ∞ | 4.00 | — | — |
| | 35 | ∞ | 0.60 | 1.516 | 64.14 |
| | 36 | ∞ | 2.10 | — | — |

| | VARIABLE SURFACE DISTANCE d[mm] | | |
|---|---|---|---|
| SURFACE NO | WIDE-ANGLE END | INTERMEDIATE | TELEPHOTO END |
| 9 | 30.37 | 16.03 | 4.50 |
| 21 | 3.45 | 8.90 | 12.76 |
| 28 | 6.31 | 4.38 | 12.11 |
| 30 | 3.43 | 14.25 | 14.19 |

TABLE 7

| | WIDE-ANGLE END | INTERMEDIATE | TELEPHOTO END |
|---|---|---|---|
| f | 11.71 | 17.55 | 23.38 |
| Fno | 2.06 | 2.62 | 3.00 |
| ω | 55.6 | 35.6 | 26.6 |
| ZOOM RATIO | | 2.00 | |

|   | SURFACE NO | PARAXIAL RADIUS OF CURVATURE r [mm] | SURFACE DISTANCE d [mm] | REFRACTIVE INDEX nd | ABBE NUMBER vd |
|---|---|---|---|---|---|
| | 1 | 107.48 | 2.00 | 1.734 | 51.47 |
| | 2 | 22.59 | 7.99 | — | — |
| | 3 | −218.26 | 1.60 | 1.439 | 94.66 |
| | 4 | 26.80 | 7.89 | — | — |
| | 5 | −44.87 | 1.55 | 1.497 | 81.55 |
| | 6 | 61.31 | 6.69 | 1.916 | 31.60 |
| | 7 | −46.99 | 0.54 | — | — |
| | 8 | −38.40 | 1.50 | 1.439 | 94.66 |
| | 9 | 460.98 | VARIABLE | — | — |
| AP | 10 | ∞ | 0.95 | — | — |
| | 11 | 31.19 | 3.33 | 2.0010 | 29.14 |
| | 12 | −416.44 | 0.50 | — | — |
| | 13 | 27.42 | 3.42 | 1.528 | 76.45 |
| | 14 | 232.56 | 0.24 | — | — |
| | 15 | ∞ | 0.94 | 1.738 | 32.33 |
| | 16 | 19.25 | 1.18 | — | — |
| | 17 | 22.36 | 1.98 | 1.729 | 54.68 |
| | 18 | 46.71 | 0.50 | — | — |
| | 19 | 40.04 | 2.64 | 1.497 | 81.55 |
| | 20 | −32.83 | 0.72 | 1.738 | 32.33 |
| | 21 | 23.50 | 1.98 | — | — |
| | 22 | 40.27 | 3.14 | 1.439 | 94.66 |

TABLE 7-continued

| | SURFACE NO | PARAXIAL RADIUS OF CURVATURE r [mm] | SURFACE DISTANCE d [mm] | REFRACTIVE INDEX nd | ABBE NUMBER vd |
|---|---|---|---|---|---|
| | 23 | −46.75 | VARIABLE | — | — |
| | 24 | −21.27 | 1.01 | 1.855 | 24.80 |
| | 25 | 48.91 | 4.77 | 1.497 | 81.55 |
| | 26 | −31.40 | 0.20 | — | — |
| | 27 | ∞ | 2.36 | 2.0010 | 29.14 |
| | 28 | −51.79 | VARIABLE | — | — |
| | 29 | 44.75 | 6.08 | 1.439 | 94.66 |
| | 30 | −47.78 | VARIABLE | — | — |
| | 31 | −38.40 | 1.20 | 1.516 | 64.14 |
| | 32 | −600.00 | VARIABLE | — | — |
| | 33 | 39.03 | 6.00 | 1.959 | 17.47 |
| | 34 | ∞ | 5.04 | — | — |
| | 35 | ∞ | 0.60 | 1.516 | 64.14 |
| | 36 | ∞ | 4.00 | — | — |
| | 37 | ∞ | 0.60 | 1.516 | 64.14 |
| | 38 | ∞ | 2.09 | — | — |

| | VARIABLE SURFACE DISTANCE d[mm] | | |
|---|---|---|---|
| SURFACE NO | WIDE-ANGLE END | INTERMEDIATE | TELEPHOTO END |
| 9 | 30.11 | 16.14 | 4.76 |
| 23 | 3.45 | 8.72 | 12.79 |
| 28 | 0.28 | 0.34 | 0.42 |
| 30 | 6.16 | 4.51 | 12.47 |

TABLE 8

| | WIDE-ANGLE END | INTERMEDIATE | TELEPHOTO END |
|---|---|---|---|
| f | 11.66 | 17.50 | 23.32 |
| Fno | 2.06 | 2.65 | 3.06 |
| ω | 55.3 | 35.5 | 26.4 |
| ZOOM RATIO | | 2.00 | |

| | SURFACE NO | PARAXIAL RADIUS OF CURVATURE r [mm] | SURFACE DISTANCE d [mm] | REFRACTIVE INDEX nd | ABBE NUMBER vd |
|---|---|---|---|---|---|
| | 1 | 89.53 | 2.00 | 1.892 | 37.13 |
| | 2 | 25.65 | 7.66 | — | — |
| | 3 | −111.34 | 1.60 | 1.497 | 81.55 |
| | 4 | 27.89 | 9.12 | — | — |
| | 5 | −32.93 | 2.45 | 1.497 | 81.55 |
| | 6 | 112.82 | 6.86 | 1.916 | 31.60 |
| | 7 | −52.34 | VARIABLE | — | — |
| AP | 8 | ∞ | 1.08 | — | — |
| | 9 | 33.30 | 3.85 | 2.0010 | 29.14 |
| | 10 | −509.16 | 3.90 | — | — |
| | 11 | 29.50 | 2.62 | 1.729 | 54.68 |
| | 12 | 65.90 | 0.70 | — | — |
| | 13 | −303.86 | 0.90 | 1.738 | 32.33 |
| | 14 | 16.22 | 0.20 | — | — |
| | 15 | 15.63 | 5.40 | 1.497 | 81.55 |
| | 16 | −31.87 | 0.72 | 1.750 | 35.33 |
| | 17 | 22.42 | 0.75 | — | — |
| | 18 | 29.70 | 3.74 | 1.497 | 81.55 |
| | 19 | −34.18 | VARIABLE | — | — |
| | 20 | −22.82 | 0.90 | 1.855 | 24.80 |
| | 21 | 48.58 | 3.33 | 1.497 | 81.55 |
| | 22 | −48.51 | 0.20 | — | — |
| | 23 | −5759.98 | 2.66 | 2.0010 | 29.14 |
| | 24 | −44.04 | 0.20 | — | — |
| | 25 | 53.93 | 5.18 | 1.439 | 94.66 |
| | 26 | −36.61 | VARIABLE | — | — |
| | 27 | −37.56 | 1.20 | 1.516 | 64.14 |
| | 28 | 149.56 | VARIABLE | — | — |
| ※ | 29 | 38.30 | 4.81 | 2.0017 | 19.32 |
| | 30 | ∞ | 6.39 | — | — |
| | 31 | ∞ | 0.60 | 1.516 | 64.14 |
| | 32 | ∞ | 4.00 | — | — |

TABLE 8-continued

| | | | | |
|---|---|---|---|---|
| 33 | ∞ | 0.60 | 1.516 | 64.14 |
| 34 | ∞ | 2.10 | — | — |

VARIABLE SURFACE DISTANCE d[mm]

| SURFACE NO | WIDE-ANGLE END | INTERMEDIATE | TELEPHOTO END |
|---|---|---|---|
| 7 | 42.04 | 27.07 | 15.34 |
| 13 | 0.90 | 0.90 | 0.90 |
| 19 | 3.44 | 11.10 | 16.61 |
| 25 | 5.18 | 5.18 | 5.18 |

| SURFACE No. | PARAXIAL RADIUS OF CURVATURE r | CONIC COEFFICIENT k | ASPHERIC COEFFICIENT | | | |
|---|---|---|---|---|---|---|
| | | | B4 | B6 | B8 | B10 |
| 29 | 38.30 | 0.00 | 1.4109E−07 | 5.7290E−10 | −5.9898E−12 | 1.2477E−14 |

TABLE 9

| | | EX 1 | EX 2 | EX 3 | EX 4 | EX 5 | EX 6 | EX 7 | EX 8 |
|---|---|---|---|---|---|---|---|---|---|
| | fw | 11.71 | 11.58 | 11.68 | 11.50 | 11.66 | 11.90 | 11.71 | 11.66 |
| | ft | 23.43 | 32.41 | 23.36 | 23.01 | 23.33 | 23.80 | 23.38 | 23.32 |
| | f1 | −24.621 | −26.958 | −24.705 | −24.491 | −25.637 | −25.344 | −24.331 | −29.493 |
| | f2 | 33.347 | 32.780 | 32.893 | 33.652 | 34.064 | 33.551 | 32.826 | 38.223 |
| | f1n_ave | −57.54 | −66.46 | −59.42 | −57.00 | −61.32 | −59.84 | −59.90 | −47.64 |
| | f2p_ave | 33.68 | 32.50 | 35.14 | 32.66 | 33.69 | 34.25 | 46.60 | 26.23 |
| INEQUALITY (1) | $1.9 \le ft/fw \le 4.0$ | 2.00 | 2.80 | 2.00 | 2.00 | 2.00 | 2.00 | 2.00 | 2.00 |
| INEQUALITY (2) | $-0.85 \le f1/f2 \le -0.55$ | −0.738 | −0.822 | −0.751 | −0.728 | −0.753 | −0.755 | −0.741 | −0.772 |
| INEQUALITY (3) | $62 \le vd1n\_ave \le 95$ | 74.03 | 70.44 | 71.48 | 69.30 | 69.30 | 80.58 | 80.58 | 66.74 |
| INEQUALITY (4) | $58 \le vd2p\_ave \le 80$ | 61.73 | 61.73 | 60.45 | 60.45 | 60.45 | 65.01 | 67.30 | 61.73 |
| INEQUALITY (5) | $1.10 \le f1n\_ave/f1 \le 4.00$ | 2.337 | 2.465 | 2.405 | 2.327 | 2.392 | 2.361 | 2.462 | 1.615 |
| INEQUALITY (6) | $20 \le vd1p \le 40$ | 31.60 | 31.60 | 29.14 | 31.60 | 32.32 | 32.32 | 31.60 | 31.60 |
| INEQUALITY (7) | $0.30 \le f2p\_ave/f2 \le 3.00$ | 1.010 | 0.992 | 1.068 | 0.971 | 0.989 | 1.021 | 1.420 | 0.686 |
| INEQUALITY (8) | $20 \le vd2n \le 40$ | 32.33 | 32.33 | 28.43 | 32.33 | 32.33 | 32.33 | 32.33 | 35.33 |

Each example can realize a compact zoom lens with a wide angle of view and excellent optical performance that supports high resolution.

Figure 17:
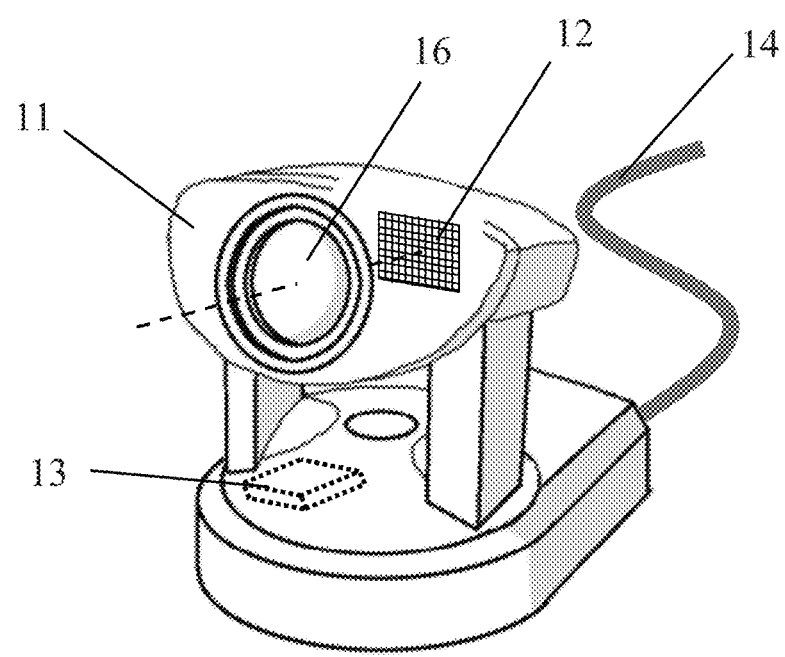
FIG. 17 illustrates an image pickup apparatus including the zoom lens according to any one of the above examples.

FIG. 17 illustrates a surveillance camera as an image pickup apparatus using the zoom lens according to any one of the above examples as an imaging optical system. In FIG. 17, reference numeral 16 denotes an imaging optical system, reference numeral 11 denotes a camera body, and reference numeral 12 denotes an image sensor such as a CCD sensor or CMOS sensor that receives light of (captures) an object image formed by the imaging optical system 16. Reference numeral 13 denotes a recording medium for recording image data generated based on the output from the image sensor 12, and reference numeral 14 denotes a transfer cable for transferring the image data to the outside.

The zoom lens according to each example can realize a compact surveillance camera having a wide angle of view an excellent optical performance that supports high resolution.

An imaging system (surveillance camera system) may include the zoom lens according to any one of examples and a control unit configured to control the zoom lens. In this case, the control unit controls the zoom lens so that each lens unit moves as described above during zooming and focusing. At this time, the control unit does not need to be integrated with the zoom lens, and may be separate from the zoom lens. For example, a control unit (control apparatus) located far from a driving unit configured to drive each lens unit in the zoom lens may include a transmitter that sends a control signal (command) for controlling the zoom lens. Such a control unit can remotely control the zoom lens.

An operation unit such as a controller or buttons for remotely operating the zoom lens may be provided to the control unit to control the zoom lens according to the input of the user through the operation unit. For example, the operation unit may include an enlargement button and a reduction button, and the control unit may send a signal to a driving unit of the zoom lens so that in a case where the user presses the enlargement button, the magnification of the zoom lens increases, and in a case where the user presses the reduction button, the magnification of the zoom lens decreases.

The imaging system may further include a display unit such as a liquid crystal panel configured to display information (moving state) about zoom of the zoom lens. The information about zoom of the zoom lens includes, for example, the zoom magnification (zoom state) and moving amount (moving state) of each lens unit. In this case, the user can remotely operate the zoom lens through the operation unit while viewing information about zoom of the zoom lens displayed on the display unit. The display unit and the operation unit may be integrated by adopting a touch panel or the like.

The zoom lens according to each example can also be used in various image pickup apparatuses such as video cameras and digital cameras, in addition to surveillance cameras. The image pickup apparatus may include an image processing circuit configured to perform electrical aberration correction processing for image data.

Each example can provide a zoom lens that is beneficial, for example, in terms of a wide angle, small size, and high optical performance.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-136475, filed on Aug. 30, 2022, which is hereby incorporated by reference herein in its entirety.

What is claimed is:

1. A zoom lens comprising, in order from an object side to an image side, a first lens unit having negative refractive power, a second lens unit having positive refractive power, and a rear group including one or more lens units,
wherein the first lens unit does not move during zooming, and distances between adjacent lens units change during zooming,
wherein the first lens unit includes two or more negative lenses, and
wherein the following inequalities are satisfied:

$1.9 \leq ft/fw \leq 4.0$ $-0.85 \leq f1/f2 \leq -0.55$ $62 \leq vd1n\_ave \leq 95$ where vd1n_ave is an average Abbe number based on d-line of all negative lenses included in the first lens unit, f1 is a focal length of the first lens unit, f2 is a focal length of the second lens unit, fw is a focal length at a wide-angle end of the zoom lens, and ft is a focal length at a telephoto end of the zoom lens.

2. The zoom lens according to claim 1, wherein the second lens unit includes two or more positive lenses, and wherein the following inequality is satisfied:

$58 \leq vd2p\_ave \leq 80$ where vd2p_ave is an average Abbe number based on the d-line of all positive lenses included in the second lens unit.

3. The zoom lens according to claim 1, wherein the first lens unit includes two or more negative lenses each having an Abbe number based line the d-line of 75 or higher.

4. The zoom lens according to claim 3, wherein the following inequality is satisfied:

$1.10 \leq f1n\_ave/f1 \leq 4.00$ where f1n_ave is an average focal length of all the negative lenses each having an Abbe number based on the d-line of 75 or higher included in the first lens unit.

5. The zoom lens according to claim 3, wherein at least one of all the negative lenses having an Abbe number based on the d-line of 75 or higher included in the first lens unit is cemented with a positive lens.

6. The zoom lens according to claim 5, wherein the following inequality is satisfied:

$20 \leq vd1p \leq 40$ where vd1p is an Abbe number based on the d-line of the positive lens.

7. The zoom lens according to claim 1, wherein the second lens unit includes two or more positive lenses having an Abbe number based on the d-line having 75 or higher.

8. The zoom lens according to claim 7, wherein the following inequality is satisfied:

$0.30 \leq f2p\_ave/f2 \leq 3.00$ where f2p_ave is an average focal length of all the positive lenses having an Abbe number based on the d-line of 75 or higher included in the second lens unit.

9. The zoom lens according to claim 7, wherein at least one of all the positive lenses having an Abbe number based on the d-line of 75 or higher included in the second lens unit is cemented with a negative lens.

10. The zoom lens according to claim 9, wherein the following inequality is satisfied:

$20 \leq vd2n \leq 40$ where vd2n is an Abbe number based on the d-line of the negative lens.

11. The zoom lens according to claim 1, wherein the rear group includes a lens unit having negative refractive power and configured to move during focusing.

12. An image pickup apparatus comprising:
the zoom lens according to claim 1; and
an image sensor configured to capture an image formed by the zoom lens.

13. An imaging system comprising:
the image pickup apparatus according to claim 12; and
a control unit configured to control the zoom lens.

14. The imaging system according to claim 13, wherein the control unit transmits a control signal configured to control the zoom lens.

15. The imaging system according to claim 13, comprising an operating member configured to operate the zoom lens.

16. The imaging system according to claim 13, comprising a display unit configured to display information about zoom of the zoom lens.

* * * * *